(12) United States Patent
Whitehead et al.

(10) Patent No.: US 11,645,625 B2
(45) Date of Patent: May 9, 2023

(54) MACHINE LEARNING SYSTEMS FOR PREDICTIVE TARGETING AND ENGAGEMENT

(71) Applicant: Job Market Maker, LLC, Charleston, SC (US)

(72) Inventors: Christina R. Whitehead, Charleston, SC (US); Joseph W. Hanna, Charleston, SC (US)

(73) Assignee: JOB MARKET MAKER, LLC, Charleston, SC (US)

( * ) Notice: Subject to any disclaimer, the term of this patent is extended or adjusted under 35 U.S.C. 154(b) by 722 days.

(21) Appl. No.: 16/546,849

(22) Filed: Aug. 21, 2019

(65) Prior Publication Data

US 2020/0065772 A1    Feb. 27, 2020

Related U.S. Application Data

(60) Provisional application No. 62/720,580, filed on Aug. 21, 2018.

(51) Int. Cl.

| | |
|---|---|
| *G06Q 10/10* | (2012.01) |
| *G06N 5/04* | (2006.01) |
| *G06N 20/00* | (2019.01) |
| *G06Q 10/1053* | (2023.01) |

(52) U.S. Cl.
CPC .......... *G06Q 10/1053* (2013.01); *G06N 5/04* (2013.01); *G06N 20/00* (2019.01)

(58) Field of Classification Search
CPC .... G06Q 10/1053; G06Q 10/105; G06N 5/04; G06N 20/00; G06N 5/046; G06F 40/20; G06F 40/205; G06F 40/30; G06F 40/103; G06F 40/166; G06F 40/56; G06F 40/216; G06K 9/6256

See application file for complete search history.

(56) References Cited

U.S. PATENT DOCUMENTS

| | | | |
|---|---|---|---|
| 7,797,725 | B2 | 9/2010 | Lunt |
| 8,799,039 | B2 | 8/2014 | Cullen, III |
| 9,842,312 | B1 | 12/2017 | Rosati |
| 10,223,671 | B1 | 3/2019 | Toomey |

(Continued)

FOREIGN PATENT DOCUMENTS

| | | |
|---|---|---|
| CN | 108335041 A | 7/2018 |
| WO | 2004061740 A1 | 7/2004 |
| WO | 2010011652 A1 | 1/2010 |

OTHER PUBLICATIONS

Tadas Baltrusaitis et. all., Multimodal Machine Learning: A Survey and Taxonomy, Aug. 1, 2017 (Year: 2017).*

(Continued)

*Primary Examiner* — Sangeeta Bahl
*Assistant Examiner* — Ivonnemary Rivera Gonzalez
(74) *Attorney, Agent, or Firm* — Husch Blackwell LLP; Bryan D. Stewart; YiKai Chen

(57) ABSTRACT

Machine learning systems for predictive targeting and optimizing engagement are described herein. In various embodiments, the system includes 1) training a first machine learning computer model to generate machine predicted outcomes; (2) determining weights based on the machine predicted outcomes; (3) generating a second machine learning computer model based on the weights; and (4) generating machine learned predictions for candidates.

30 Claims, 11 Drawing Sheets

(56) References Cited

U.S. PATENT DOCUMENTS

| | | | |
|---|---|---|---|
| 10,402,757 B1 | 8/2019 | Shah | |
| 11,080,626 B2 | 8/2021 | Branagh | |
| 11,163,810 B2 | 11/2021 | Kube | |
| 2002/0099580 A1 | 7/2002 | Eicher | |
| 2003/0028393 A1 | 2/2003 | Coulston | |
| 2003/0208434 A1 | 11/2003 | Posner | |
| 2004/0267606 A1 | 12/2004 | Brishke | |
| 2005/0010467 A1 | 1/2005 | Dietz | |
| 2005/0114279 A1 | 5/2005 | Scarborough et al. | |
| 2005/0246299 A1* | 11/2005 | Scarborough | G09B 7/02 |
| | | | 706/21 |
| 2006/0031109 A1 | 2/2006 | Larue | |
| 2006/0167896 A1 | 7/2006 | Kapur | |
| 2006/0229896 A1* | 10/2006 | Rosen | G06Q 10/1053 |
| | | | 705/321 |
| 2007/0033060 A1 | 2/2007 | Gopalan | |
| 2008/0065467 A1 | 3/2008 | Nyegaard | |
| 2008/0120152 A1 | 5/2008 | McCrea | |
| 2008/0208907 A1 | 8/2008 | Tolve | |
| 2009/0164291 A1 | 6/2009 | Shah | |
| 2009/0307052 A1 | 12/2009 | Mankani | |
| 2010/0169143 A1 | 7/2010 | Carr | |
| 2011/0125622 A1 | 5/2011 | McCrea | |
| 2011/0131146 A1 | 6/2011 | Skutnik | |
| 2012/0215711 A1 | 8/2012 | Brief | |
| 2013/0046704 A1 | 2/2013 | Patwa | |
| 2013/0085954 A1 | 4/2013 | Hanneman | |
| 2013/0325540 A1 | 12/2013 | Shi | |
| 2014/0089216 A1* | 3/2014 | Costa | G06Q 50/01 |
| | | | 705/319 |
| 2014/0122355 A1 | 5/2014 | Hardtke | |
| 2014/0136438 A1* | 5/2014 | Barnett | G06Q 10/1053 |
| | | | 705/321 |
| 2014/0297550 A1 | 10/2014 | Miller | |
| 2015/0025329 A1* | 1/2015 | Amarasingham | G16H 40/67 |
| | | | 600/301 |
| 2015/0032654 A1 | 1/2015 | Huff | |
| 2015/0127567 A1* | 5/2015 | Menon | G06Q 10/1053 |
| | | | 705/321 |
| 2015/0186846 A1 | 7/2015 | Menon | |
| 2015/0186847 A1 | 7/2015 | Menon | |
| 2015/0220884 A1 | 8/2015 | Kabdebon | |
| 2016/0026347 A1 | 1/2016 | Gehring | |
| 2016/0125360 A1 | 5/2016 | Ali | |
| 2016/0350425 A1 | 12/2016 | Tripathi | |
| 2017/0011313 A1 | 1/2017 | Pochert | |
| 2017/0039508 A1 | 2/2017 | French | |
| 2017/0132571 A1 | 5/2017 | Stock | |
| 2017/0316361 A1 | 11/2017 | Jagota | |
| 2017/0357945 A1 | 12/2017 | Ashkenazi | |
| 2018/0096307 A1 | 4/2018 | Fortier | |
| 2018/0232683 A1 | 8/2018 | Chuang | |
| 2018/0232703 A1 | 8/2018 | Chuang | |
| 2018/0232704 A1 | 8/2018 | Porter | |
| 2018/0336528 A1 | 11/2018 | Carpenter | |
| 2019/0019159 A1* | 1/2019 | Champaneria | H04W 4/14 |
| 2019/0019160 A1* | 1/2019 | Champaneria | G06F 40/295 |
| 2019/0050813 A1* | 2/2019 | Guo | G06Q 10/1053 |
| 2019/0180300 A1 | 6/2019 | Weston | |
| 2019/0197180 A1* | 6/2019 | Jersin | H04L 51/02 |
| 2019/0213522 A1 | 7/2019 | Cong | |
| 2019/0385124 A1* | 12/2019 | Newman | G06Q 10/1091 |
| 2020/0005243 A1 | 1/2020 | Pong | |
| 2020/0034357 A1 | 1/2020 | Panuganty | |
| 2020/0065772 A1 | 2/2020 | Whitehead | |
| 2020/0117490 A1 | 4/2020 | Sengupta | |
| 2020/0134243 A1 | 4/2020 | Vardi | |
| 2020/0302370 A1 | 9/2020 | Mathiesen | |
| 2021/0103876 A1* | 4/2021 | Petrosso | G06F 40/56 |

OTHER PUBLICATIONS

Shreya Gupta, Radar Chart, its Applications and Limitations, Sep. 15, 2012, 2 pages (Year: 2012).*

Shure, Predicting When People Quit Their Jobs, Jan. 5, 2017 (Year: 2017).*

Li, Predict Employee Turnover With Python, Nov. 6, 2017 (Year: 2017).*

International Search Report & Written Opinion dated Jan. 26, 2021 for International Patent Application No. PCT/US20/54270.

International Search Report & Written Opinion dated Sep. 8, 2021 for International Patent Application No. PCT/US/21/36230.

International Search Report & Written Opinion dated Sep. 9, 2021 for International Patent Application No. PCT/US/21/36225.

International Search Report & Written Opinion dated Sep. 29, 2021 for International Patent Application No. PCT/US/21/36228.

Advanced Partners, Staffing Profitability Calculator, Apr. 19, 2018, http://www.advancepartners.com/staffing-profitability-calculator/, p. 2.

International Search Report and Written Opinion dated Dec. 10, 2019 or international PCT patent application No. PCT/US19/49910.

International Search Report and Written Opinion dated Jan. 29, 2020 for international PCT patent application No. PCT/US19/61766.

International Search Report and Written Opinion dated Nov. 4, 2019 for international PCT patent application No. PCT/US19/47939.

International Preliminary Report on Patentability dated Sep. 22, 2020 for international PCT patent application No. PCT/US19/47939.

International Preliminary Report on Patentability dated Jan. 15, 2021 for international PCT patent application No. PCT/US19/49910.

* cited by examiner

MACHINE LEARNING SYSTEMS FOR PREDICTIVE TARGETING AND ENGAGEMENT

CROSS REFERENCE TO RELATED APPLICATIONS

This application claims benefit and priority to U.S. patent application No. 62/720,580, filed Aug. 21, 2018, entitled "MACHINE LEARNING SYSTEMS AND METHODS FOR PREDICTIVE TARGETING AND ENGAGEMENT," which is incorporated herein by reference in its entirety.

This application incorporates by reference herein in its entirety U.S. patent application Ser. No. 15/119,535, entitled "PROVISIONING AN INTEGRATED RECRUITING, TRAINING AND FINANCING SERVICE VIA A NETWORK," filed Aug. 17, 2016.

BACKGROUND

Identifying talent and making smart hiring choices can be a costly and laborious process. Further, hiring the right person for a given position often requires a pool of qualified applicants to apply for the given position. As will be understood, a number of unqualified applicants will likely apply for any given position, diluting the applicant pool (e.g., only a small fraction of applicants are potentially suitable for a given position). To concentrate the applicant pool, talent recruitment processes require methods that reduce costs involved in identifying and recruiting qualified candidates.

Identifying potential job candidates based on internal organization and external factors can also be technically challenging. In particular, some companies (for example, LinkedIn™ or Twitter™) have attempted to track user activity on social media and rank candidates based on job search behaviors that may indicate that they are open to a new job. Companies, such as LinkedIn™ or Twitter™, have also given candidates the option to flag themselves as interested in talking about new opportunities. These previous solutions are lagging indicators that a person is already an active job seeker. Because a candidate is likely to be an active job seeker prior to "flagging" themselves, the previous solutions may result in identification of candidates that are already interviewing with other companies and that may be off the market before a recruiter can engage with the candidates. In other words, previous solutions may provide insufficient results that are too late to provide actionable advantages over competing recruiters. In addition, previous solutions may not provide additional insights that would help recruiters understand why a person is likely interested in switching jobs.

BRIEF SUMMARY OF THE DISCLOSURE

Briefly described, and according to one embodiment, aspects of the present disclosure generally relate to systems and methods for identifying and recruiting qualified candidates.

In particular embodiments, by tracking leading indicators and events that tend to trigger the initial thought process around switching jobs, aspects of the present disclosure allow for recruiters and internal human resources personnel to access key talent before they are actively job searching and being contacted by other recruiters based on lagging indicators like social media activity (e.g., external or internal key talent). In certain embodiments, the systems and methods discussed herein enable users to set alerts to track candidates so that they may be the first to know when a candidate becomes more likely to engage with a recruiter. As will be understood from discussions herein, the present systems and processes may be used to identify external candidates for a potential job opening or internal employees for retention purposes. As such, systems and processes discussed herein for a candidate (or a like term), are also for an employee within an organization.

For example, and in some embodiments, an system may include a "watchdog," or the like, for monitoring one or more changes in company management, salary adjustments or layoffs, relevant world/local news, or any other appropriate information that may impact the potential candidate's current role. In this example, aspects of the systems discussed herein may detect these one or more changes, evaluate their potential impact on the candidate's current role, and furthermore generate or recommend personalized language and messaging that are targeted and relevant to the specific candidate to help recruiters create a rapport with candidates and increase response rates.

In at least one embodiment, the present systems identify candidates that are highly likely to change jobs to expand the applicant pool for a given position and/or to increase the number of qualified applicants for the position. In one or more embodiments, identification of the candidates directs recruitment processes towards talent that may be easier to attract to the organization, and, thereby, reduces the costs and time involved in finding new talent for positions within the organization. In various embodiments, the present systems determine areas that may impact candidates and influence their likelihood of changing jobs. In at least one embodiment, the system identifies: 1) candidates that would be more attracted to the strengths that an organization has to offer; and 2) language that would most likely elicit a potential response from a particular candidate based on who they are and what is currently impacting them.

In one or more embodiments, the present systems generate alerts upon detecting that a predefined candidate experiences or demonstrates an increase in their likelihood to change jobs or a change in their status so that a communication with the predefined candidate could be initiated when they are most likely ready to consider new opportunities (e.g., to increase the likelihood of getting a positive response to such a communication). In at least one embodiment, the present systems can automatically contact, using optimal language, candidates of interest that are identified to be candidates most likely ready to consider a new job. In various embodiments, the present systems automatically generate suggestions for new candidates that are more likely to be attracted to an organization, which can allow the organization to maintain an on-going pipeline of talent for future needs. In at least one embodiment, the present systems may automatically email candidates (e.g., matching skills and experience of known job openings, and determined to likely consider a job change) about a job opening, and may construct emails using language that is personally generated for each specific candidate to maximize a likelihood of a positive response.

In at least one embodiment, the present systems may automatically identify other organizations that have talent pools that are similar to the talent needs of a particular organization. In one or more embodiments, the system may monitor the talent pools of the identified organizations to determine, for candidates therein, changes in likelihood to consider a new position.

According to a first aspect, a method for predictive targeting and optimized engagement, comprising: A) training, with a training set, at least one primary machine learning computer model to generate a plurality of machine predicted outcomes; B) determining one or more weights based on the plurality of machine predicted outcomes and the training set; C) generating at least one secondary machine learning computer model based on the one or more weights; D) generating, via the at least one secondary machine learning computer model, one or more machine learned predictions; E) assigning a respective classification to each individual of a plurality of individuals based on the one or more machine learned predictions; F) receiving a set of candidate criteria; G) processing the set of candidate criteria to identify a subset of individuals from the plurality of individuals that satisfies the set of candidate criteria; H) determining a ranking of the subset of individuals based on the respective classification assigned to individual ones of the subset of individuals; and I) generating a notification based on the ranking.

According to a second aspect, the method of the first aspect or any other aspect, further comprising: A) receiving, from one or more databases, data associated with a plurality of individuals, wherein a portion of the received data is received in response to predetermined data triggers configured to monitor changes to a current status of the received data; B) determining, for each individual, data of interest within the received data, the data of interest comprising candidate information, role information, and company information; C) normalizing the data of interest into a normalized format to generate normalized data; and D) creating, from the normalized data of interest, the training set comprising known parameters and known outcomes.

According to a third aspect, the method of the second aspect or any other aspect, wherein generating the at least one secondary machine learning computer model comprises: A) creating, from the normalized data of interest, a test set with unknown parameters; and B) weighting the unknown parameters with the one or more weights.

According to a fourth aspect, the method of the third aspect or any other aspect, further comprising: A) calculating the one or more weights from the plurality of machine predicted outcomes and the training set; and B) weighting the known parameters with the one or more weights via the at least one primary machine learning computer model.

According to a fifth aspect, the method of the second aspect or any other aspect, wherein normalizing the data of interest further comprises performing entity resolution on the data of interest.

According to a sixth aspect, the method of the first aspect or any other aspect, further comprising: A) calculating, for each parameter of each identified individual, an impact score; B) determining, for each parameter and based on each impact score, at least one most impactful parameter; C) generating a candidate list based on the ranking of the subset of individuals; and D) providing, in the candidate list, the at least one most impactful parameter for the individual ones of the subset of individuals.

According to a seventh aspect, the method of the sixth aspect or any other aspect, wherein determining the at least one most impactful parameter comprises one or more feature importance methods.

According to an eighth aspect, the method of the seventh aspect or any other aspect, wherein determining the at least one most impactful parameter further comprises: A) determining at least one most positively impactful parameter; and B) determining at least one most negatively impactful parameter.

According to a ninth aspect, a method for predictive targeting and optimized engagement, comprising: A) training, with a training set, at least one primary one machine learning computer model to generate a plurality of machine predicted outcomes; B) determining one or more weights based on the plurality of machine predicted outcomes and the training set; C) generating at least one secondary machine learning computer model based on the one or more weights; D) generating, via the at least one secondary machine learning computer model, one or more machine learned predictions; E) aggregating the one or more machine learned predictions; F) generating, from the aggregated machine learned predictions, a talent risk retention score; and G) sending a notification based on the talent risk retention score.

According to a tenth aspect, the method of the ninth aspect or any other aspect, further comprising: A) receiving, from one or more databases, data associated with a plurality of individuals employed by an organization, wherein a portion of the received data is received in response to predetermined data triggers configured to monitor changes to a current status of the received data; B) determining, for each individual, data of interest within the received data, the data of interest comprising candidate information, role information, and company information; C) normalizing the data of interest into a normalized format; and D) creating, from the normalized data, the training set comprising known parameters and known outcomes.

According to an eleventh aspect, the method of the tenth aspect or any other aspect, wherein the plurality of individuals are employed in a particular department of the organization.

According to a twelfth aspect, the method of the tenth aspect or any other aspect, wherein the plurality of individuals are employed in a particular location of the organization.

According to a thirteenth aspect, the method of the tenth aspect or any other aspect, wherein the plurality of individuals present a particular experience level.

According to a fourteenth aspect, the method of the tenth aspect or any other aspect, wherein generating the at least one secondary machine learning computer model comprises: A) creating, from the normalized data of interest, a test set with unknown parameters; and B) weighting the unknown parameters with the one or more weights.

According to a fifteenth aspect, the method of the ninth aspect or any other aspect, further comprising: A) comparing the talent risk retention score to one or more predefined thresholds; and B) based on the comparison, assigning a classification to the talent retention risk score, wherein the classification is selected from a group comprising of low, average, and high.

According to a sixteenth aspect, a system for predictive targeting and optimized engagement, comprising: A) at least one database; and B) at least one processor in communication with the at least one database, the at least one processor being configured to: 1) train, with a training set, at least one primary one machine learning computer model to generate a plurality of machine predicted outcomes; 2) determine one or more weights based on the plurality of machine predicted outcomes and the training set; 3) generate at least one secondary machine learning computer model based on the one or more weights; 4) generate, via the at least one secondary machine learning computer model, one or more machine learned predictions; and 5) assign a respective classification to each individual of a plurality of individuals based on the one or more machine learned predictions.

According to a seventeenth aspect, the system of the sixteenth aspect or any other aspect, wherein the at least one processor is further configured to: A) receive one or more predetermined triggers configured to monitor changes to a current status of data associated with the plurality of individuals, wherein the one or more predetermined triggers cause the at least one processor to retrieve, from the at least one database, the data associated with the plurality of individuals; B) determine a respective data of interest within the retrieved data for each of the plurality of individuals, the respective data of interest comprising candidate information, role information, and company information; C) normalize the respective data of interest for each of the plurality of individuals into a normalized format; and D) create, from the normalized data, the training set, comprising known parameters and known outcomes.

According to an eighteenth aspect, the system of the seventeenth aspect or any other aspect, wherein: A) the candidate information comprises current tenure, average tenure in previous roles, number of previous roles with current company, number of previous roles at other companies, skills, education level, relative pay, previous industries, previous company size, previous company age, geography, and commute time; B) the role information comprises title, level, functions, similar open positions, and open growth opportunities; and C) the company information comprises industry, company type, company size, age, employee brand measurements, trends in employee brand, news and events, and trends in news and events.

According to a nineteenth aspect, the system of the eighteenth aspect or any other aspect, wherein: A) the company type is selected from a group comprising: public, private, government, and school; and B) the company size comprises a company revenue metric and a number of company employees metric.

According to a twentieth aspect, the system of the seventeenth aspect or any other aspect, wherein training comprises: A) calculating, from the plurality of machine predicted outcomes and the training set, one or more weights; and B) weighting, with the one or more weights and via the at least one primary machine learning computer model, the known parameters.

According to a twenty-first aspect, the system of the sixteenth aspect or any other aspect, wherein generating the at least one secondary machine learning computer model comprises: A) creating, from normalized data of interest, a test set with unknown parameters; and B) weighting the unknown parameters with the one or more weights.

According to a twenty-second aspect, the system of the sixteenth aspect or any other aspect, wherein the at least one processor is further configured to: A) compare the one or more machine learned predictions and the classifications to third-party data from the at least one database; B) determine particular language comprising subject lines and keywords from the third-party data that is likely to elicit a response from each of the plurality of individuals, based on the one or more machine learned predictions and the classifications; and C) generate one or more strings of electronic text via natural language processing, wherein the one or more strings of electronic text comprise language substantially similar to the particular language.

According to a twenty-third aspect, the system of the twenty-second aspect or any other aspect, wherein the at least one processor, to generate the one or more strings of electronic text, is further configured to select at least a portion of the one or more strings of electronic text using at least one conditional logic process.

According to a twenty-fourth aspect, the system of the sixteenth aspect or any other aspect, wherein the at least one processor, to generate the at least one secondary machine learning model, is further configured to generate the at least one secondary model by combining one or more intermediary machine learning models according to:

$$E(x_{ijg}) = E(f_1(x_{ijg}), \ldots, f_n(x_{ijg}));$$

wherein: 1) $E(x_{ijg})$ represents the second machine learning model; 2) f is an intermediary machine learning model; 3) x is a vector comprising the normalized data of interest; 4) i is a candidate; 5) j is a company currently employing the candidate i; and 6) g is a role performed by the candidate i at the company j.

According to a twenty-fifth aspect, the system of the sixteenth aspect or any other aspect, wherein the at least one processor, to assign the classification, is configured to evaluate and assign each of the one or more machine learned predictions according to:

$$c(x_{ijg}) = \begin{cases} \text{candidate is least likely to ENGAGE if } h(x_{ijg}) < h_0 \\ \text{candidate may ENGAGE if } h_0 < h(x_{ijg}) < h_1 \\ \text{candidate is more likely to ENGAGE } h_1 < h(x_{ijg}) < h_2 \\ \text{candidate is most likely to ENGAGE } h(x_{ijg}) > h_2 \end{cases};$$

wherein: 1) $h(x_{ijg})$ is a machine learned prediction from the one or more machine learned predictions; 2) $h_0$ is a predefined will-not-engage threshold; 3) $h_1$ is a predefined may-engage threshold; 4) $h_2$ is a predefined more-likely-to-engage threshold; and 5) $c(x_{ijg})$ is the classification to which each one the one or more machine learned predictions is assigned.

According to a twenty-sixth aspect, the system of the sixteenth aspect or any other aspect, wherein the at least one processor is further configured to: A) retrieve, from the at least one database, a plurality of historical classifications associated with the plurality of individuals; B) determine, for each individual, if a historical classification matches the assigned classification; C) upon determining, for a particular individual, that the assigned classification does not match the historical classification, determine if the particular individual is included on a recruitment watch list; and D) upon determining, that the particular individual is included on the recruitment watch list, automatically generate and transmit, to an electronic profile associated with the recruitment watch list, an alert describing that a classification for the particular individual has changed.

According to a twenty-seventh aspect, the system of the twenty-sixth aspect or any other aspect, wherein the assigned classification of the particular individual is determined to exceed the historical classification.

According to a twenty-eighth aspect, the system of the sixteenth aspect or any other aspect, wherein the at least one processor is further configured to generate, for each individual, a data visualization comprising the classification and the one or more machine learned predictions.

According to a twenty-ninth aspect, the system of the twenty-eighth aspect or any other aspect, wherein the data visualization is a radar chart.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
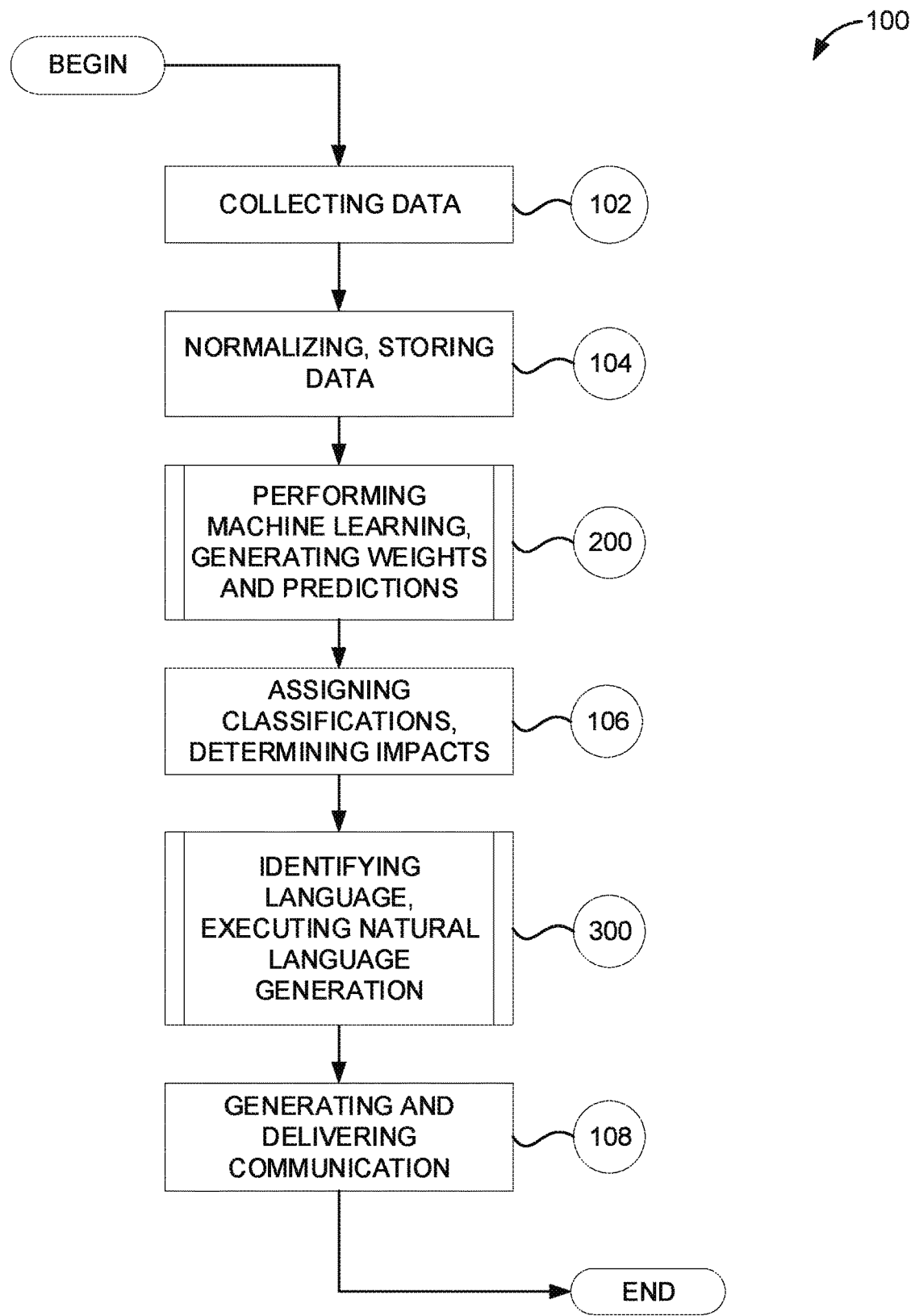
FIG. 1 illustrates an exemplary candidate classification and communication process, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

One or more references are incorporated by reference herein. Any incorporation by reference is not intended to give a definitive or limiting meaning of a particular term. In the case of a conflict of terms, this document governs.

Overview

Aspects of the present disclosure generally relate to systems and methods for identifying and recruiting qualified candidates.

The predictive outcomes and measures generated via the present system, in various embodiments, are based on data about people (e.g., job candidates), companies, and industries. This data is collected from various sources and can be used to: 1) find appropriate candidates for a particular job opening; and/or 2) identify employees (or sets of employees) that may leave or be susceptible to poaching or targeting by other companies and/or recruiters. The system may then provide or suggest communications to potential job candidates (to attempt to recruit them) or to employees (to attempt to retain them), or provide other suggestions to potentially recruit candidates (e.g., wait until a shift in industry and then contact) or retain employees (e.g., Nick is underpaid compared to his peers, consider giving him a raise or he may be susceptible to recruiting efforts/tactics).

In at least one embodiment, the system collects data collects and stores data in various formats, such as, for example, as files on Amazon S3™ service, postgres databases, and Amazon Redshift™ databases. In one or more embodiments, the stored data and/or the storage medium may be optimized for data retrieval and/or analysis. In various embodiments, collected data is mapped (via pointers, metadata, or the like) between different sources by unique characteristics. For example, collected data can be mapped according to aspects: 1) personal characteristics, such as, for example, name, contact info, and work history; 2) organizational characteristics, such as, for example, company names, Uniform Resource Locators (URLs), industries; and 3) physical information, such as, for example, locations (e.g., cities, states, zip codes, coordinates). According to various aspects of the present disclosure, the collected data is parsed and normalized to a consistent format. For string variables, typical tasks can include but are not limited to removing punctuation and extra white space, formatting the data to a consistent case (e.g., by removing all capitalization, using sentence case, or capitalizing each word), normalizing abbreviations, standardizing terms of art in one or more fields of use, and fixing common spelling errors.

In at least one embodiment, the collected data can be modified and organized via one or more entity resolution processes. In various embodiments, the one or more entity resolution processes may include, but are not limited to, comparing data items within the normalized data, weighting each data item, and weighting matches between one or more data items. The weighting can be proportional to values or combinations of data that are unique for a given entity. For example, URLs for a company or zip codes for a location may each be associated with an individual value or relevance score, and furthermore a match between two data sources may be associated with a separate "matched" value or relevance score.

According to various aspects of the present disclosure, the system includes an analysis engine. In at least one embodiment, the analysis engine can include or be executed by, but is not limited to, at least one processor. In one or more embodiments, the analysis engine can be hosted in a cloud, or otherwise distributed, computing environment. For example, the analysis engine can be hosted on Amazon Web Services™ (or a similar cloud host), which may leverage Apache Spark™, R, Python™ Structured Query Language (SQL), and other tools for ingesting and processing the data to transform it into particular formats for training and predicting different types of models. In one or more embodiments, the system cleans and normalizes string-formatted data for compatibly mapping with data across different sources. Furthermore, in some embodiments, the system may classify string-formatted data into various categories for consistency across sources. For example, the system may include and train one or more classification models (such as, for example, mutual information classifiers) to classify job titles into job levels or functions of differing granularity depending on the needs of the final model. To provide consistency in data across sources, the system may perform one or more techniques for classifying data points including, but not limited to, levels and areas of education, industries of companies, and/or other relevant data points. In various embodiments, establishing data consistency may reduce noise in model development and improve performance of final models. For example, incorrectly classifying a level of expertise (e.g., senior manager) as a level of education (e.g., MBA) may introduce noise or error into a model, and the trained models described herein may eliminate these types of errors.

In one embodiment, missing values for data and/or observations may be imputed, or otherwise accommodated for, based on the type of model being leveraged and the impact of the missing observation, data, value, etc. In at least one embodiment, the system may convert to an integer or numeric format. For example, the system, via hot encoding, may convert string-formatted data to an integer or numeric format.

In one or more embodiments, following data formatting processes, the system may initiate one or machine learning models to generate predictions that are furthermore combined into an ensemble prediction. In various embodiments, the one or more machine learning models can include, but are not limited to: 1) neural networks; 2) random forest models; and 3) one or more other machine learning model types. In at least one embodiment, the system may initiate machine learning models of multiple types. In various embodiments, the system may combine one or more individual models into an ensemble model, ranging from simple to complex. Similar to the way an individual model would be trained across a variety of hyperparameters to identify the optimal values through cross-validation, the system may test ensemble models across various methods and techniques to identify the ensemble model that generates the most accurate predictions or most often correctly identifies the correct classification of the outcome, which may be weighted based on the type of error that is most costly. In at least one embodiment, the system may combine the one or more individuals into the ensemble model according to Equation 1, in which $E(x_{ijg})$ represents the ensemble model, $f_k(x)$ represents an individual model, and $x_{ijg}$ represents a vector of characteristics for a candidate, i, working at company, j, in a role, g.

$$E(x_{ijg})=E(f_1(x_{ijg}), \ldots f_n(x_{ijg})) \quad \text{(Equation 1)}$$

In one or more embodiments, from the ensemble model, the system may generate, for each candidate, one or more machine learned predictions. In at least one embodiment, the one or more machine learned predictions may be engagement scores, or the like, that quantify a candidate's risk or inclination to respond to a recruitment technique (for example, a recruitment email) or to leave their current role. For example, a machine learned prediction may be a score between about 1-100. In various embodiments, the system defines each $f_k(x)$ by optimizing a machine learning model through training against a historical dataset where the outcomes are known.

In one or more embodiments, a separate machine learning algorithm may be trained to optimally combine each of the individual outcomes for the most accurate prediction possible in the ensemble model, E(x). The current data for each candidate may be used to generate a prediction based on the trained models for determining the final classification for each candidate. In various embodiments, the numerical outcome of the ensemble model may be the candidate's "Engage Score", which is then classified into various categories, for example, "Least Likely to ENGAGE", "May ENGAGE", "More Likely to ENGAGE", or "Most Likely to ENGAGE."

In various embodiments, the system classifies each candidate based on comparisons between the candidate's one or more machine learned predictions and one or more classification thresholds. In at least one embodiment, the system performs classification according to Equation 2, in which $h(x_{ijg})$ is a machine learned prediction from the one or more machine learned predictions, $h_0$ is a predefined will-not-engage threshold, $h_1$ is a predefined may-engage threshold, $h_2$ is a predefined more-likely-to-engage threshold, $c(x_{ijg})$ is the classification to which each one the one or more machine learned predictions is assigned.

$$c(x_{ijg}) = \begin{cases} \text{candidate is least likely to ENGAGE if } h(x_{ijg}) < h_0 \\ \text{candidate may ENGAGE if } h_0 < h(x_{ijg}) < h_1 \\ \text{candidate is more likely to ENGAGE } h_1 < h(x_{ijg}) < h_2 \\ \text{candidate is most likely to ENGAGE } h(x_{ijg}) > h_2 \end{cases} \quad \text{(Equation 2)}$$

In at least one embodiment, following generating the overall prediction, the system determines an impact of each component of the model on the overall score. In at least one embodiment, the system aggregates the impacts across the major categories of factors that influence the likelihood of voluntary turnover. In various embodiments, the system measures the impact of each factor leveraging feature importance methodologies at the global and local levels (based on the model type combined with the value of the factors). In one or more embodiments, the feature importance methods vary by types of models used and are aggregated across models and categories to achieve a high-level category score for each candidate. In certain embodiments, these category scores may be used to determine how candidates are being impacted by their current environment, and to identify the areas that a user should focus on with this particular person or to match people to organizations that may have complementary strengths or weaknesses relative to the person.

In various embodiments, the system compares the impacts, as well as the characteristics of the candidate, to stored recruitment language (e.g., language used by recruiters in recruiting emails). In at least one embodiment, the system, via the comparison, identifies subject lines, language, and keywords that may be most effective in eliciting a positive response from each potential candidate based on the impacts that appear most influential on the candidate and the candidate's characteristics. In some embodiments, this optimized language may then be used by a natural language generation algorithm to draft a subject line and an email that a recruiter can use or edit to send to candidates. For example, previously communicated emails and responses may be analyzed for language and structure to identify words and patterns that have the highest response rates based on the features of a given candidate. The system algorithms may use conditional logic for selecting words from the optimized language dataset based on a defined structure of a subject line, sentence, and email that takes into account the various features of a particular candidate to identify the language that is most likely to elicit a response.

In at least one embodiment, the system may generate models, outcomes, predictions, and classifications for companies and industries using ensemble models that combine aggregate impacts of the candidates that make up each company or industry as well as models that generate company specific and industry specific scoring methodologies. In other words, the system may generate aggregated models, outcomes, predictions, and classifications that characterize a set of individuals. For example, the system may generate an aggregated model, outcomes, predictions, and a classification for teams of engineers at a particular company. The aggregated model, outcomes, predictions, and classification may assist the company in determining which engineering teams may be likely to leave (e.g., quality assurance team, software development team, etc.). As another example, for a particular company, the system may perform the above described evaluations for sets of employees located at different company locations. The generated model, outcomes, predictions, and classification may assist the company in determining which company location presents an elevated employee retention risk. In at least one embodiment, the system may generate a "talent retention risk" (TRR) score (also sometimes referred to as "talent retention score") that represents a retention risk for a set of individuals. Continuing the previous example, for each set of employees (e.g., for each location), the system may generate a TRR, and may rank the sets of employees based on the TRR (e.g., where a first ranked set represents a set of employees with the highest risk of voluntarily exiting the company).

In at least one embodiment, the system can allow candidates, organizations, and/or recruiters to create a system profile (e.g., a candidate profile, an organization profile, or a recruiter profile). In various embodiments, the system may automatically generate a system profile using collected and normalized data, and other information described herein. In at least one embodiment, the system can include a portal (e.g., hosted on a website, or a similar medium) that allows a user to search through and view one or more system profiles. A system profile can include, but is not limited to, candidate parameters, prediction scores, classifications, impacts, and category scores. In one or more embodiments, the system may generate one or more visualizations to express and display (e.g., on a system profile) one or more of the prediction scores, classifications, impacts, and category scores. For example, the system may generate a radar chart 600A (FIG. 6A) that provides relative strengths of one or more candidate parameters. As another example, the system may generate an engagement meter 600B (FIG. 6B) that visualizes a classification and/or prediction score. In at least one embodiment, the system profile can further include generated insights and/or tip summaries for engaging a candidate. For example, the system profile can include a tips section 700 (FIG. 7) that provides information regarding engagement methods predicted to elicit engagement from a candidate (e.g., associated with the system profile).

Figure 8A:
FIGS. 8A-C are exemplary search portals, according to one embodiment of the present disclosure.
Figure 8B:
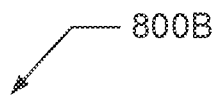
Figure 8C:
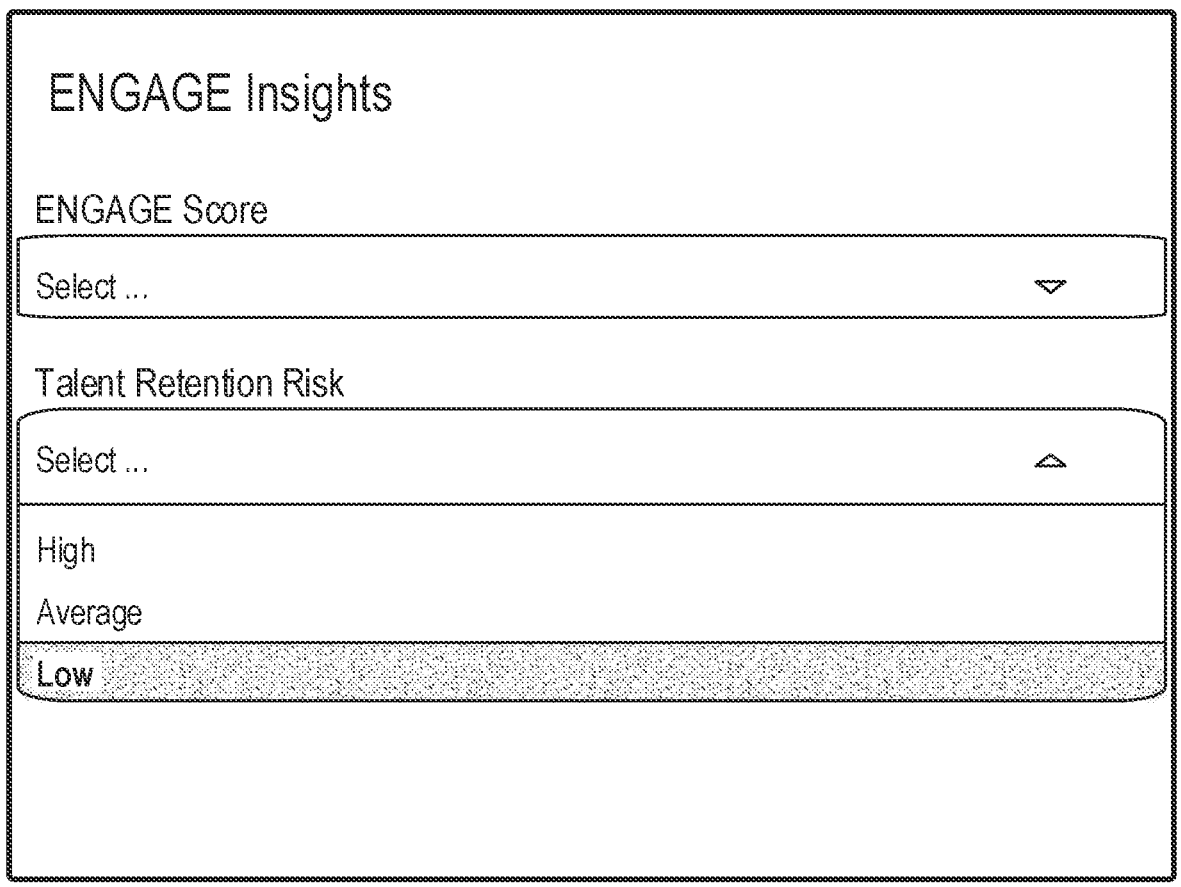

Also, the system can receive search criteria from the user. The search criteria can include, but is not limited to, prediction scores, classifications, and categories that, in various embodiments, are generated by the system based on a set preferences received from the user. In at least one embodiment, the system can provide, on a system profile, one or more search portals for receiving search criteria. For example, the system can include one or more search portals 800A-C (FIG. 8 A-C) that can receive various search criteria. The system can process the search criteria at a search engine server, and can retrieve and display, to the user, candidate and/or organizational information. In at least one embodiment, the candidate and/or organizational information can include, but is not limited to, profiles and documents, and the system can sort the profiles and documents according to a system-calculated relevance score describing how well a profile or document matches the received search criteria. In at least one embodiment, the system can receive, from a user, filtering criteria. For example, the system can receive, from a user, and process a profile filter such the user is only provided information for candidates that have a system profile. In one or more embodiments, a system profile for a candidate and/or a profile for an organization can display system-generated scores and/or score histories through email functionality on the profile page, through email extensions, and through other browser extensions related to specific candidates and/or organizations. A system profile for an organization can be a profile representative of an individual company, a group of companies, or for an entire industry. Also, the system profile for an organization can include one or more TRR scores, displayed on the profile page and/or on an extension therefrom.

In various embodiments, the system can generate an organization summary including, but not limited to: 1) an organization name; 2) industry; 3) organization size; 4) organization revenue; 5) top hiring source; 6) top turnover destination; 7) TRR; and 8) one or more ratings (that may be sourced from one or more third party sources). The system can retrieve and/or collect data, and can provide the data as an input to a natural language generation process. The natural language generation process can output a text-based organization summary that describes an associated organization. For example, the system may retrieve and/or collect data for an "Organization A," including, but not limited to: 1) "The Organization A, Inc."; 2) media industry; 3) 37,773 employees; 4) $58 billion yearly revenue; 5) Organization B Co. is top hiring source; 6) Organization B Co. is top turnover destination; 7) TRR; and 8) an "above average" third party rating. The system can provide the data to a natural language generation process that outputs:

"The Organization A, Inc. is a media company with an estimated 37,773 employees and annual revenue of $58 billion. Their top hiring source is Organization B Co. and the top destination for employees who leave the company is also Organization B Co. The Organization A, Inc. has maintained an average talent retention risk score over the last 3 months and currently has an average talent retention risk score that is comparable to their industry. The Organization A, Inc. has an overall Glassdoor™ rating above the average industry rating. In addition to the overall rating The Organization A, Inc. has above average ratings in compensation & benefits, senior management, and career opportunities."

In at least one embodiment, the system can automatically generate and transmit insights and/or alerts based on preferences received from a user. For example, the system can receive and process preferences from a user for insight alerts when any of a particular set of candidates demonstrates a classification change from "More Likely to ENGAGE" to "Most Likely to ENGAGE." Upon detecting that one of the particular candidates has demonstrated the classification change, the system can automatically generate an alert to the user, the alert specifying the particular candidate and including a link to a system profile associated with the candidate. In at least one embodiment, the system can generate communications including, but not limited to, emails, push notifications, and other alerts. In one or more embodiments, the system can receive from a user, and process, an automation preference that causes the system to fully automate system processes including, but not limited to, candidate evaluation and classification via machine learning, candidate identification and selection, and communication generation and transmission. In at least one embodiment, the received automation preference can specify automation of only a subset of system processes. For example, an automation preference may cause the system to automate processes up to communication generation, thereby providing the user an opportunity to review generated communications prior to transmission.

DESCRIPTION OF THE FIGURES

Referring now to the figures, for the purposes of example and explanation of the fundamental processes and components of the disclosed systems and methods, reference is made to FIG. 1, which illustrates an exemplary candidate classification and communication process 100, according to one embodiment of the present disclosure. As will be understood and appreciated, the exemplary process 100 shown in FIG. 1 represents merely one approach or embodiment of the present system, and other aspects are used according to various embodiments of the present system. As will be understood by one having ordinary skill in the art, the steps and processes shown in FIG. 1 (and those of all other flowcharts and sequence diagrams shown and described herein) may operate concurrently and continuously, are generally asynchronous and independent, and are not necessarily performed in the order shown.

At step 102, the system collects data regarding one or more candidates, one or more companies, and one or more roles. In at least one embodiment, the present system receives data/datasets from multiple data partners and publicly available sources, as well as collects data directly from websites through, for example, web scraping technology. In certain embodiments, this data may be received as a file, through an application programming interface (API) call, scraped directly, or via other mechanisms. Once collected, the data may be then stored in databases or a data lake. According to various aspects of the present disclosure, the data may then be processed, cleaned and mapped across the various sources.

The collected data can include, but is not limited to, company data, role data, and candidate data. The company data can include, but is not limited to: 1) industry; 2) company type, including, but is not limited to, public, private, government, academic; 3) company size, including, but is not limited to, revenue, and number of employees; 4) company age; and 5) one or more employee brand metrics. The role data can include, but is not limited to: 1) role title; 2) role level, including, but not limited to, experience level, and education level; 3) role functions; 4) similar open positions; and 5) open growth opportunities. The candidate data can include, but is not limited to: 1) current tenure; 2) average tenure in previous roles; 3) number of previous roles with current company; 4) number of previous roles with previous companies; 5) skills; 6) education level; 7) relative pay; 8) previous industries; 9) previous company size, including, but not limited to, revenue, and number of employees; 10) previous company age; 11) geography (e.g., candidate location, current company location, previous company location, etc.); and 12) commute time.

In at least one embodiment, the system can calculate one or more secondary metrics from the collected data. For example, the system can compute, for each candidate, an estimated salary demand. To determine an estimated salary demand, the system can utilize collected data including, but not limited to: 1) role title; 2) role level; 3) statistical data describing actual salaries of various workers having various role titles; 4) skills; 5) relative pay; 6) education level; 7) geography; and 8) commute time. Also, the system can include one or more secondary metrics as parameters in one or more machine learning processes (as described herein). For example, the system can calculate estimated salary demands for a plurality of candidates, and can leverage the calculated demands as an input to a machine learning process for identifying the likelihood of each candidate leaving their current position (e.g., for a particular position at another organization).

At step 104, the system normalizes and stores, in one or more databases, the collected data. In at least one embodiment, the system, to perform data normalization, may perform one or more data modifications including, but not limited to: 1) imputing missing data; 2) converting data to one or more formats (e.g., for example, converting string data to numeric data); 3) removing extra characters; 4) formatting data to a specific case (e.g., for example, converting all uppercase characters to lowercase characters); and 5) standardizing data formats. Also at step 104, in at least one embodiment, prior to data normalization, the system can perform entity resolution on the collected data.

In at least one embodiment, the system can evaluate completeness of collected data. For example, the system may determine a magnitude of missing data in a collected dataset, and, based on the magnitude, can calculate a "completeness" score. The system can include a "completeness" threshold, and can compare completeness scores to the completeness threshold. In one or more embodiments, if the system determines that a dataset's completeness score does not satisfy a completeness threshold, the system can exclude the dataset from further evaluation. By evaluating and filtering for completeness, the system may exclude datasets that are intolerably data deficient (e.g., and which may deleteriously impact further analytical processes).

The system (e.g., at an analysis engine thereof) performs one or more machine learning processes 200 (FIG. 2) to evaluate the normalized data. The system can process the normalized data to create a training set of known parameters and known outcomes. The system can generate and iteratively train one or more machine learning models to generate a prediction score for each of the one or more candidates. As described herein, a prediction score can be a metric representing a candidate's likelihood to positively engage with recruitment efforts (or stay or leave a current organization). For example, a high prediction score can indicate that an associated candidate, based on evaluated parameters thereof, is likely to respond to recruitment efforts and/or may be disposed to voluntary turnover.

At step 106, the system classifies each of the one or more candidates based on their generated prediction score. To assign classifications, the system may compare the prediction score to a set of predefined thresholds, and can assign a classification to an associated candidates based on the one or more prediction scores and the set of predefined thresholds (e.g., as described herein, according to Equation 2). For example, the system may utilize a prediction score scale ranging from 0-100. The system may further utilize a set of predefined thresholds including, but not limited to: 1) a "Least Likely to ENGAGE" threshold of 0-25; 2) a "May ENGAGE" threshold of 26-50; 3) a "More Likely to ENGAGE" threshold of 51-75; and 4) a "Most Likely to ENGAGE" threshold of 76-100. For a particular example candidate, the system can generate a prediction score of 63.

The system may then compare the predicted score to each predefined threshold, and determine that the predicted score satisfies the "More Likely to ENGAGE" threshold. Accordingly, the system can assign a "More Likely to ENGAGE" classification to the particular candidate.

In at least one embodiment, classification may further include updating one or more databases to include the classification and associated candidate and/or organization information. For example, the system may update, at a database and for a particular candidate, existing information to include a classification assigned to the particular candidate. In various embodiments, the system can also determine that a previously generated classification for a particular candidate has changed, and, depending on the nature of the change, can perform various actions based on the change. The action can include, but is not limited to, generating alerts, updating watch lists, and generating and transmitting communications (e.g., to the particular candidate, to an organization, to a recruiter, etc.).

Continuing with step 106, the system can determine, for each classified candidate, one or more impact scores. As described herein, an impact score can refer to a magnitude of influence that a particular parameter (for a candidate evaluated in a machine learning model) exerted over a candidate's generated prediction score. In other words, an impact score can refer to a particular parameter's predictive weight and directionality thereof. For each candidate, the system can evaluate the machine learning model (that predicted an associated candidate score), the parameters and parameter weights, and the predicted score to determine the one or more impact scores.

In an exemplary scenario, the system calculates, via a machine learning model and for a particular candidate, a prediction score of 90. The system evaluates the machine learning model (e.g., in particular, calculated weights used therein) and calculates an impact score for each parameter utilized therein. An exemplary set of parameters can include, but is not limited to: 1) "Parameter A," distance of the candidate to a current company; 2) "Parameter B," a cost of living to relative pay ratio; and 3) "Parameter C," a number of positions held by the candidate at the current company and a number of positions held at a previous company. In some embodiments, the system calculates the impact scores on a scale of (−10)-(+10) (although any suitable range or scale may be used). The system may consider a score of (−10) to represent a most negative influence (e.g., reducing the prediction score and the likelihood of the candidate to ENGAGE), and may consider a score of (+10) to represent a most positive influence (e.g., increasing the prediction score and the likelihood of the candidate to ENGAGE). The system can calculate a "Parameter A" impact score of 10, a "Parameter B" impact score of 9, and a "Parameter C" impact score of −3. Based on the impact scores, the system can determine that the prediction score of 90 was: 1) positively influenced by a comparatively high distance between the candidate and the company (e.g., the candidate is required to make an excessive daily commute); 2) positively influenced by an above average cost of living to pay ratio (e.g., the candidate is making comparatively less than geographical peers); and 3) negatively influenced by a comparatively lower number of positions held at the current company compared to number of positions held at the previous company (e.g., the candidate may not be experiencing upward mobility at the current company).

As described herein, by determining an influence of each parameter on a candidate's prediction score, the system can identify parameters of a candidate that are most likely and least likely to contribute to voluntary turnover. The system can leverage the identified parameters to advantageously direct recruitment efforts (e.g., recruitment communications to a candidate). For example, in the above scenario, the system may process the "Parameter A" and "Parameter B" impact scores and configure recruitment communication processes to include, in communications to the candidate, language describing a reduced commute and increased cost of living to pay ratio of an open position at another company. For each candidate, the system can store the one or more determined impact scores along with the associated parameters, classification, and other candidate information.

In at least one embodiment, the system executes one or more natural language generation processes 300 to identify language for inclusion in recruitment communications to one or more candidates classified at step 108. The system can retrieve, from one or more databases, stored recruitment language, candidate classifications, impact scores, and parameters (e.g., candidate characteristics, metrics, etc.) associated with the impact scores. The system can process and compare the retrieved language, classifications, scores, and parameters to identify optimal recruitment language including, but not limited to, subject lines, keywords, and other language. In at least one embodiment, the retrieved language can include metadata associating various portions of the retrieved language with the retrieved parameters, classifications, and/or impact scores. In one or more embodiments, the metadata can indicate that (based on the retrieved classifications, impact scores and parameters) a particular portion of the retrieved language is most likely to elicit a positive response from the one or more candidates (e.g., when included in a communication thereto).

In one or more embodiments, the system can identify optimal recruitment language by evaluating, via one or more machine learning models, the retrieved language, impact scores, and parameters (and/or other parameters, factors, or data). For example, the system can create (or retrieve from a database) a training dataset including known language, impact scores, parameters, and outcomes. The outcomes can identify whether or not the known language was successful in eliciting a response from one or more candidates (e.g., associated with the known impact scores, parameters, and outcomes). The system can train, using the training dataset, the one or more machine learning models to identify, for each candidate, language, language structures, and other patterns that demonstrate a highest predicted response rate based on parameters and impact scores of each candidate. The system can execute one or more trained machine learning models to identify the optimal language for each candidate. For each candidate, the system can provide the identified optimal language to one or more natural language generation algorithms, or the like, that generate optimal recruitment language for the candidate.

For example, the one or more machine learning models can identify (based on a particular candidate's classification, impact scores, and parameters) a key phrase, "increase your net income, reduce your commute," and provide the phrase to a natural language generation algorithm. The natural language algorithm can process the key phrase to generate an optimal subject line, "You Could Be Making More and Driving Less!," that the system (and/or a recruiter) can use in a recruitment communication to the particular candidate.

At step 108, the system generates, from outputs of the one or more natural language generation processes 300, one or more communications. The system can include, in a communication, optimal recruitment language generated by the one or more natural language generation algorithms. For example, the system can generate an email, and can modify a subject line of the email to include a generated optimal subject line. The system can also modify a body of the email to include one or more generated optimal sentences. In various embodiments, the system can generate communications including, but not limited to, electronically-transmitted communications (e.g., emails, texts, push notifications, alerts, etc.) and drafts for delivered communications (e.g., draft letters to be printed and mailed to one or more candidates).

Continuing with step 108, the system transmits the one or more generated communications. The system can transmit communications to a recruiter (e.g., for review and transmission to one or more associated candidates), to one or more associated candidates, and/or human resources or an internal company recruiter (e.g., where the system is used internally to identify employees that may leave for a new company). As described herein, the system may retrieve a profile associated with a user, and may determine if the profile settings are configured for automated communications. In at least one embodiment, upon determining that a profile is configured for automated communications, the system can automatically transmit one or more generated communications to one or more associated candidates.

In at least one embodiment, the system can include a transmission threshold. In one or more embodiments, the system can generate and transmit to an associated user (e.g., a recruiter) a transmission confirmation request including a draft generated communication (for review and approval). The system can receive a transmission confirmation signal (from the associated user) that causes the system to confirm the transmission threshold and proceed with transmitting the draft generated to one or more associated candidates.

In some embodiments, the system can generate a user interface including one or more text editing fields. The system can prepopulate the text editing fields with the generated communications. As an example, a "to," "cc," "bcc," "from," "subject," and main body of the generated communication can be prepopulated into corresponding text editing fields. The system can receive edits the generated communications from a user. The system can save the edits for later use and/or send the edited communication to the intended recipients.

In at least one embodiment, the system can generate a ranking of one or more candidates. For example, the system can compare classifications (e.g., engagement classifications) of one or more candidates, and can generate a list. Based on the classification comparisons, the one or more candidates can be ordered, in the list, from highest to lowest (e.g., from highest potential engagement to lowest potential engagement). The system may also process a generated list to identify a subset of candidates, or the like, to provide as an input to notification processes, and communication generation and transmission processes.

Figure 2:
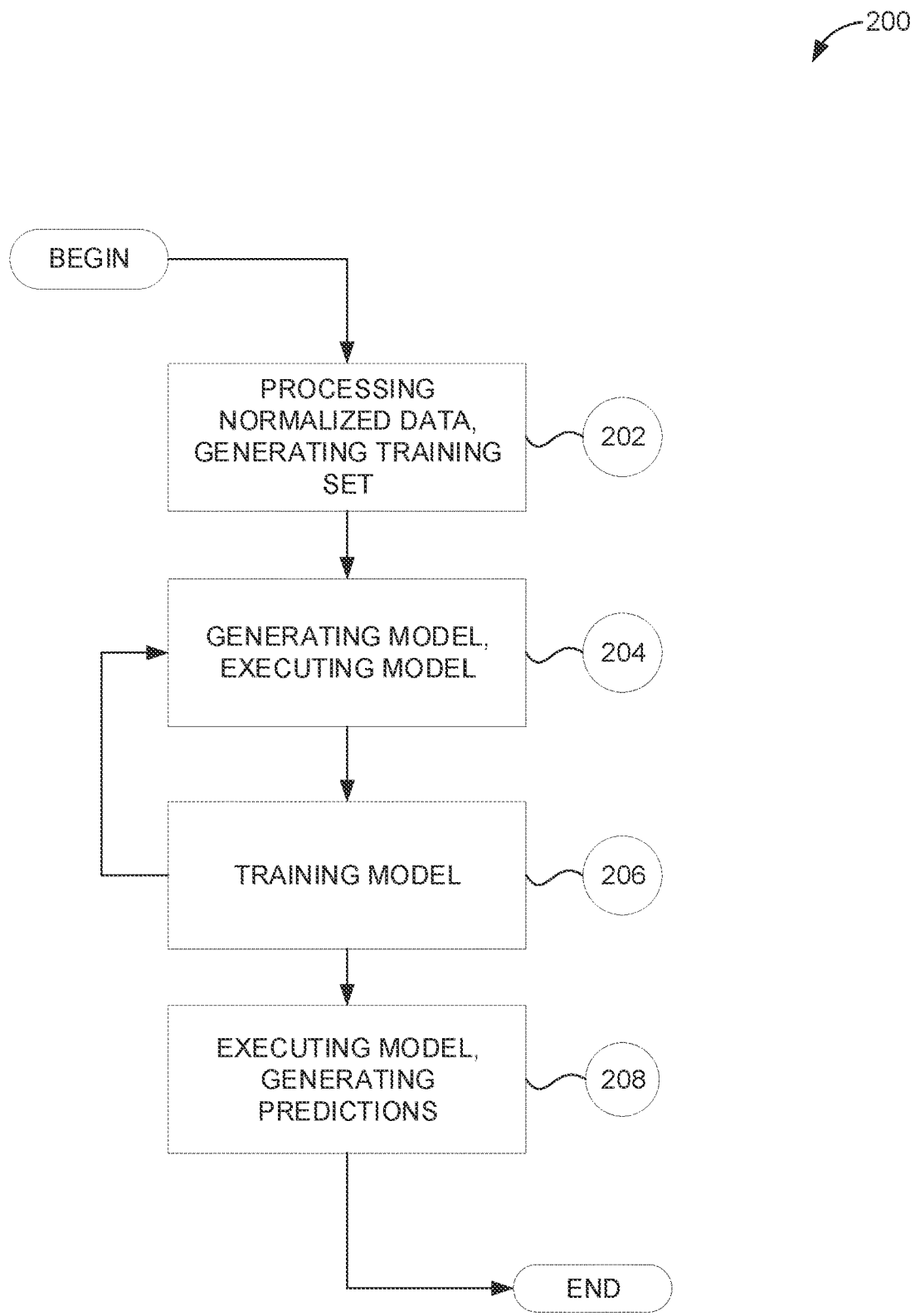
FIG. 2 illustrates an exemplary machine learning process, according to one embodiment of the present disclosure.

FIG. 2 illustrates an exemplary machine learning process 200, according to one embodiment of the present disclosure. At step 202 the system processes data (e.g., normalized data) to generate one or more training datasets. For example, the system can generate a training dataset that includes: 1) known inputs including a set of candidates and a set of parameters (e.g., candidate characteristics, etc.); and 2) a set of known outcomes (e.g., prediction scores and/or classifications). When the training data includes historical known outcomes, the set of known outcomes can also include, but is not limited to, data describing whether each candidate: (1) responded to a recruitment email; (2) agreed to interview with a potential employer; (3) interviewed but did not receive an offer; and (4) left a current job for another job position. Also at step 202, the system can process normalized data to generate one or more test datasets including inputs without known outcomes.

At step 204, the system generates and executes one or more machine learning models to analyze known inputs of a training set. From the known inputs, the one or more machine learning models can generate one or more prediction scores. In one or more embodiments, while generating the one or more machine learning models, the system may process weights received from a model training process (step 206), and may weight each known input (or parameter produced therefrom) according to the received weights.

At step 206, the system trains the one or more machine learning models. For example, the system can generate a first version of a machine learning model. The first version machine learning model can generate, from the known parameters, a set of machine learned outcomes (e.g., prediction scores). The system can compare the set of machine learned outcomes to the training set, and can calculate one or more error metrics between the machine-learned outcomes and the known outcomes. To minimize the one or more error metrics, the system can iteratively optimize the first version machine learning model into one or more secondary version machine learning models by: 1) calculating and assigning a weight to each of the known parameters (or derivative thereof); 2) generating, (e.g., at step 204 and from the weighted known parameters), one or more additional machine learning models that generate one or more additional sets of machine learned outcomes; 3) comparing the one or more additional sets of machine-learned outcomes to the known outcomes; 4) re-calculating the one or more error metrics; 5) re-calculating and re-assigning weights to each of the weighted known parameters to further minimize the one or more error metrics; 6) generating e.g., at step 204) additional machine learning models and machine learned outcomes, and repeating the process. In at least one embodiment, the system can combine one or more machine learning models to generate an ensemble machine learning model (e.g., as described herein, according to Equation 1).

The system can iteratively repeat steps 204-206, thereby continuously training and/or combining the one or more machine learning models until a particular machine learning model demonstrates one or more error metrics below a predefined threshold, or demonstrates an accuracy and/or precision at or above one or more predefined thresholds.

At step 208, upon determining that the particular machine learning model satisfies an error, accuracy, and/or precision threshold, the system processes, via the particular machine learning model, one or more test datasets generated at step 202. The one or more test datasets can include parameters for candidates for which there is not a known outcome. The particular machine learning model can generate a prediction score for each of the one or more candidates, and the system can classify each of the one or more candidates (as described herein) according to their prediction score.

Figure 3:
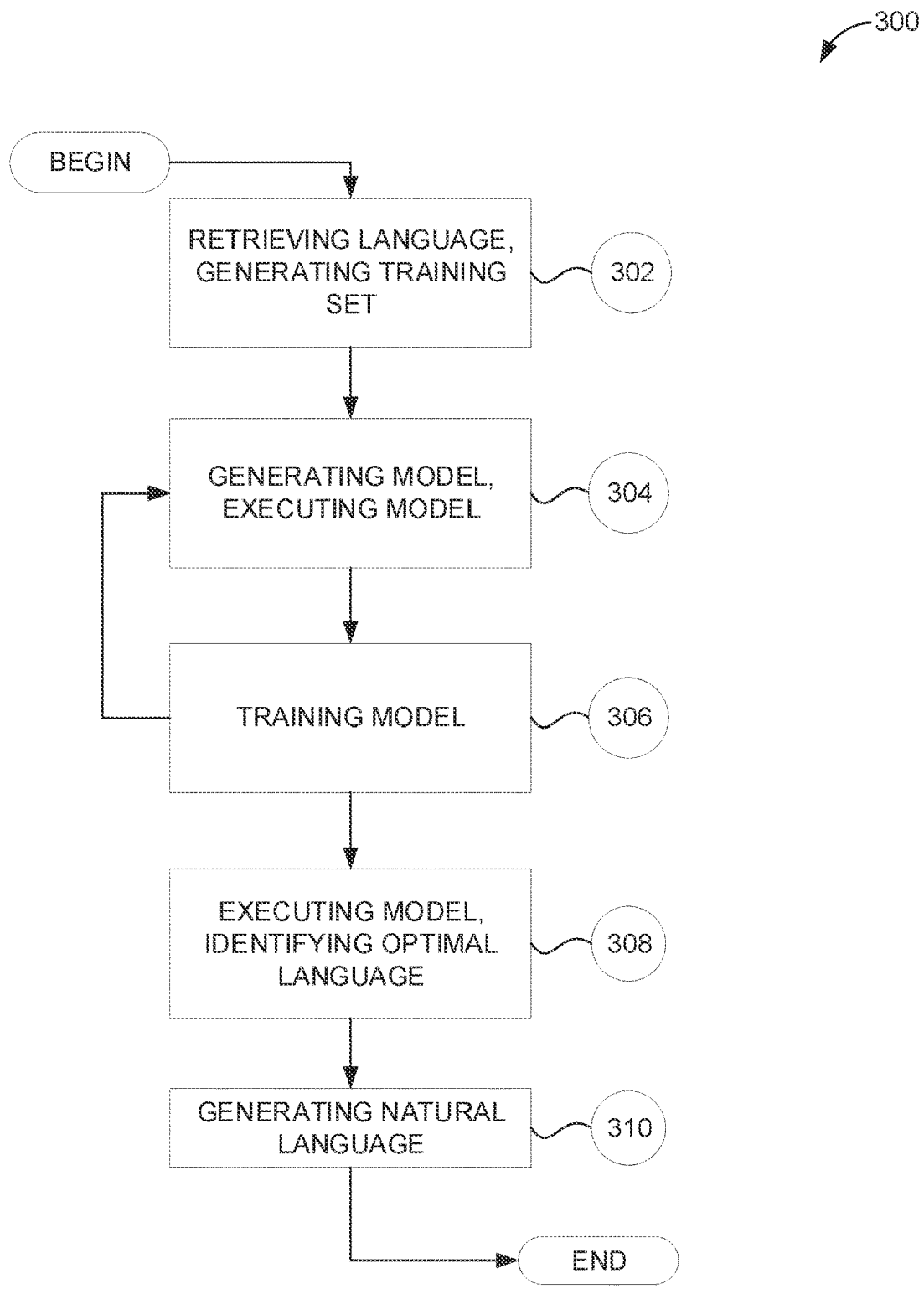
FIG. 3 illustrates an exemplary natural language generation process, according to one embodiment of the present disclosure.

FIG. 3 illustrates an exemplary natural language process 300, according to one embodiment of the present disclosure. At step 302, the system can retrieve, from one or more databases, stored recruitment language, candidate classifications, impact scores, and parameters (e.g., candidate characteristics, metrics, etc.) associated with the impact scores. In at least one embodiment, the retrieved parameters can be parameters determined to be most positively or negatively influential for a prediction score (e.g., a likelihood of a candidate to ENGAGE), based on impact score calculations. The language items included in the retrieved language can also each include an engagement score that quantifies an effectiveness of the language item in eliciting engagement from a candidate (e.g., wherein the language item was used in a natural language generation process to generate a communication for the candidate). The retrieved language can also include one or more historical parameters, prediction scores, impact scores and/or classifications associated with each language item. The system can process the retrieved language and metadata to create a training dataset of known inputs (e.g., language items, and the known parameters, prediction scores, impacts, and/or classifications) and known outcomes (e.g., optimal language and engagement scores).

Continuing with step 302, the system receives test data including, but not limited to, candidate classifications, impact scores, and parameters generated from an associated machine learning process (e.g., such as the machine learning process discussed in relation to FIG. 2). From the received test data, the system can create a test dataset. In at least one embodiment, the retrieved language used to create the training dataset may be selected such that the candidate classifications, impact scores, and parameters therein are substantially analogous to those included in the test data.

At step 304, the system identifies optimal recruitment language by generating one or more machine learning models that evaluate the known inputs of the training dataset. The one or more machine learning models can generate optimal language items (e.g., language items, and combinations of language items, sourced from the retrieved language), and can calculate and assign, to each optimal language item, predicted engagement scores. As described herein, an engagement score can be a metric that estimates a likelihood that an optimal language item will elicit engagement from an associated candidate (e.g., when used to generate a communication for the candidate). In one or more embodiments, while generating the one or more machine learning models, the system may process weights received from a model training process (e.g., at step 306), and may weigh or evaluate each known input (or parameter produced therefrom) according to the received weights.

At step 306, the system trains the one or more machine learning models. For example, the system can generate a first version of a machine learning model. The first version machine learning model can generate, from the known inputs of the training dataset, a set of optimal language items and predicted engagement scores. The system can compare the optimal language items and the predicted engagement scores to the known outcomes of the training dataset, and can calculate one or more error metrics between the machine-learned outcomes and the known outcomes. For example, the system can compare each of the optimal language items and predicted engagement scores to analogous language items and engagement scores in the training dataset, and, based on the comparison, can calculate an error metric for each optimal language item.

To minimize the one or more error metrics, the system can iteratively optimize the first version machine learning model into one or more secondary version machine learning models by: 1) calculating and assigning a weight to each of the known inputs (and/or derivatives thereof); 2) generating, at step 304 and from the weighted known inputs, one or more additional machine learning models that generate one or more additional sets of machine learned outcomes; 3) comparing the one or more additional sets of machine-learned outcomes to the known outcomes; 4) re-calculating the one or more error metrics; 5) re-calculating and re-assigning weights to each of the weighted known inputs to further minimize the one or more error metrics; 6) generating (e.g., at step 304) additional machine learning models and machine learned outcomes. In at least one embodiment, the system can combine one or more machine learning models to generate an ensemble machine learning model (e.g., as described herein, according to Equation 1).

The system can iteratively repeat steps 304-306, thereby continuously training and/or combining the one or more machine learning models until a particular machine learning model demonstrates one or more error metrics below a predefined threshold, or demonstrates an accuracy and/or precision at or above one or more predefined thresholds. The system can also process new known outcomes over time. As an example, unknown outcomes may become known outcomes when a candidate decides whether to respond to an email, perform a job interview, or accept a job position. The actual outcome for the job candidate can be fed back into the system to continually improve training.

At step 308, upon determining that the particular machine learning model satisfies an error metric, accuracy, and/or precision threshold, the system processes, via the particular machine learning model, one or more test datasets (e.g., the one or more data sets generated at step 302). The particular machine learning model can generate, for each candidate, optimal language items and predicted engagement scores. The system can rank the optimal language items based on the predicted engagement scores, and can provide top-ranked optimal language items (e.g., items with the highest predicted engagement scores) as language inputs to one or more natural language generation algorithms, or the like. In at least one embodiment, the system may include a predicted engagement threshold, and may select language inputs (to the natural language generation algorithms) by comparing each predicted engagement score to the predicted engagement threshold, and selecting optimal language items whose predicted engagement score satisfies the predicted engagement threshold.

At step 310, the one or more natural language algorithms process the language inputs to generate optimal recruitment language. The optimal recruitment language can include, but is not limited to, subject lines, body sentences and/or paragraphs, introductions, and other linguistic structures and/or patterns for use in recruitment communications. In at least one embodiment, the one or more natural language algorithms may receive and process one or more language preferences that designate a particular format for generated optimal recruitment language. For example, the one or more natural language algorithms can receive and process a language preference for subject lines, and, accordingly, can generate only optimal recruitment language for subject lines.

Figure 4:
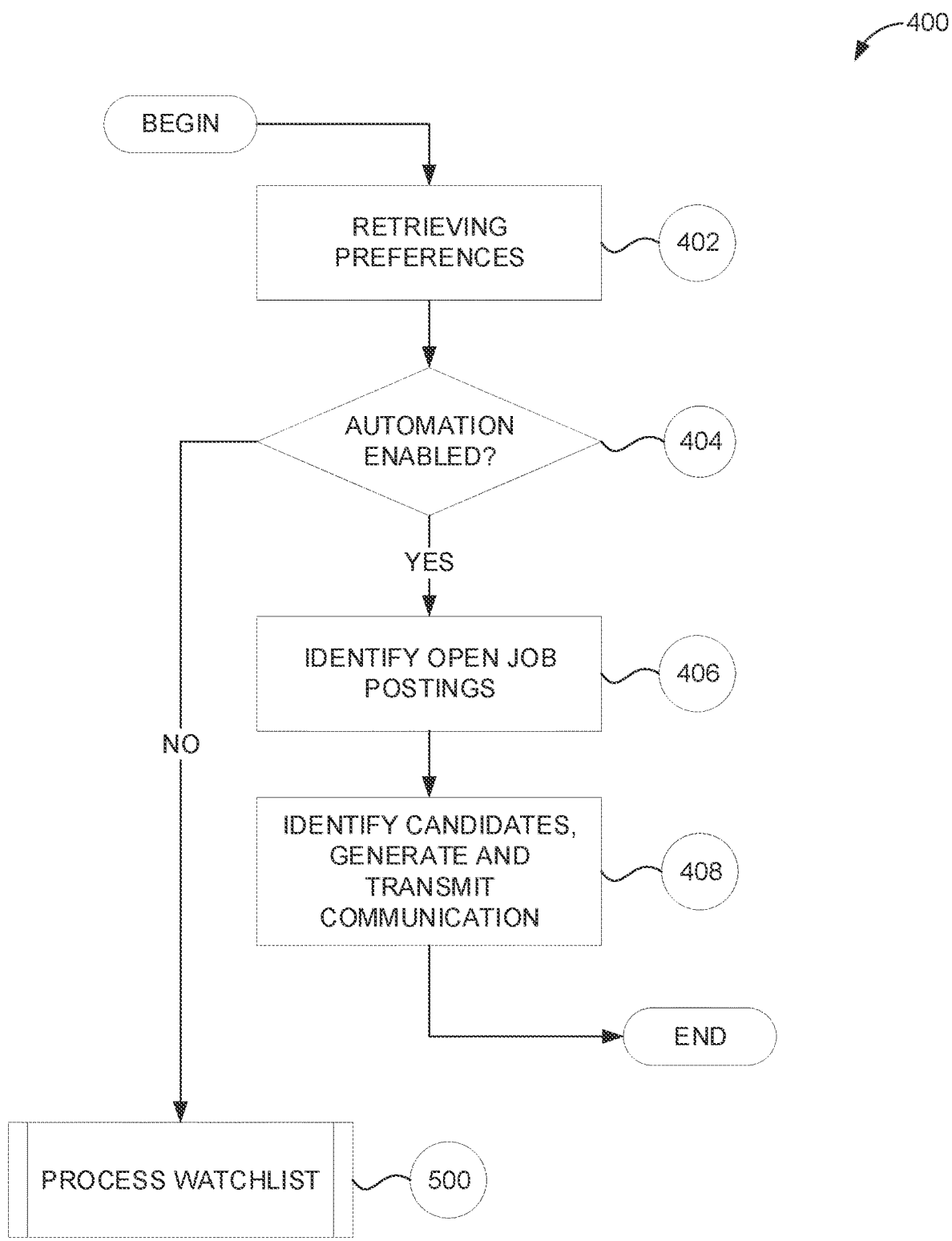
FIG. 4 illustrates an exemplary automated communication process, according to one embodiment of the present disclosure.

FIG. 4 illustrates an exemplary automated communication process 400, according to one embodiment of the present disclosure. As described herein, the present system can partially and/or fully automate candidate evaluation, recruitment language generation, and recruitment communication processes. Also, as described herein, the system can include user profiles that allow recruiters (and other individuals) to access system services and configure user preferences to modify aspects of system services and/or establish trigger conditions for executing system services.

At step 402, the system retrieves preferences from a user profile. In at least one embodiment, the preferences include a selection for an automation setting that, when enabled, causes the system to automatically perform actions including, but not limited to, machine learning processes 200 and natural language generation processes 300.

Figure 5:
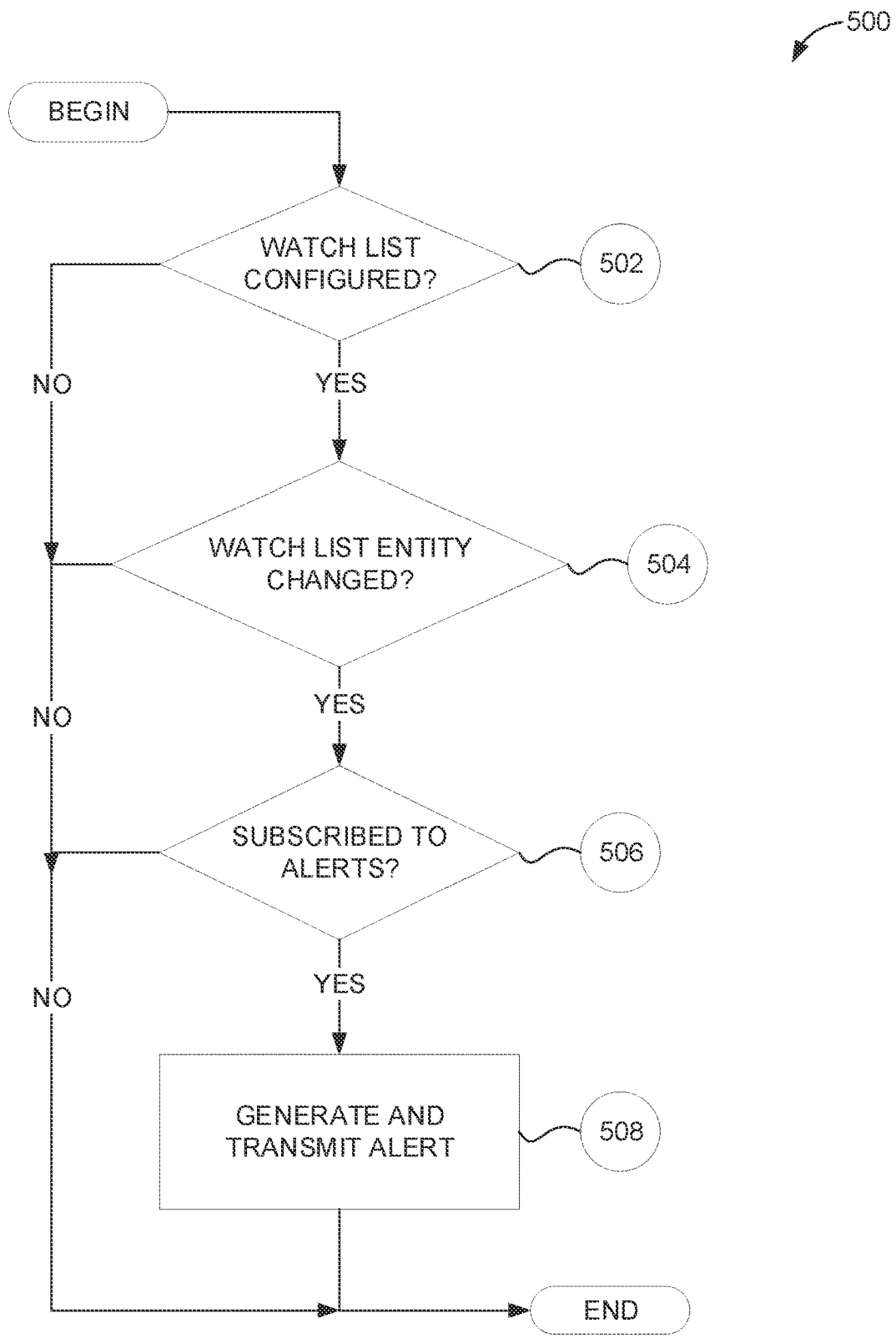
FIG. 5 illustrates an exemplary automated alert process, according to one embodiment of the present disclosure.

At step 404, the system determines if the preferences include a selection enabling the automation setting. In at least one embodiment, upon determining that the preferences include the selection, the system proceeds to step 404. In one or more embodiments, upon determining that the preferences do not include the selection, the system proceeds with an automated alert process 500 (FIG. 5).

At step 406, the system processes retrieved preferences to identify one or more job opening parameters. The one or more job opening parameters can include characteristics for roles and positions for which a user (e.g., associated with the user profile) would like to identify and engage candidates. For example, the one or more job opening parameters can include, but are not limited to: 1) role parameters (e.g., duties, pay, title, etc.); 2) industry parameters; 3) location parameters; 4) experience parameters; 5) skill parameters; and 6) one or more additional parameters and/or characteristics. The system can utilize the one or more job opening parameters as inputs to a job opening identification process. In at least one embodiment, the job opening identification process can include, but is not limited to, analyzing current job openings to identify one or more preference-matching job postings. The system can retrieve the current job openings from one or more databases, from one or more public websites, and/or from one or more additional current job opening sources (e.g., such as an internal or intra-company job database).

At step 408, the system processes the identified preference-matching job postings to generate candidate criteria. The candidate criteria can include the analyzed job opening parameters, as well as additional candidate characteristics and/or parameters included in the preference-matching job postings. For example, at step 406, the system may identify job opening parameters including, but not limited to: 1) $140,000+ annual salary; 2) software engineer; 3) within 30 miles of San Francisco, Calif., USA; 4) 5+ years of experience; and 5) proficiency in Ruby, Python, and Amazon Web Services. In the same example, also at step 406, the system may identify and process a preference-matching job posting for a "Software Engineer 3." Continuing the example, the system can generate candidate criteria including the job opening parameters, and further including an education parameter for "M.S. or PhD. required."

Continuing with step 408, the system retrieves, and/or collects and normalizes, company, role, and candidate data (as described herein) associated with one or more individuals. The system processes the company, role, and candidate data for each individual, and selects one or more potential candidates, for further evaluation, that satisfy the generated candidate criteria. The system can provide the selected one or more potential candidates (in particular, data thereof) to a machine learning process 200 that generates prediction scores and impact scores for each of the one or more potential candidates. The system can classify each of the one or more potential candidates according to their prediction scores (as described herein), and, based on the classifications, can identify one or more target candidates (from the one or more potential candidates). For example, the system may identify target candidates by identifying every candidate (of the one or more potential candidates) that is classified as "Most Likely to ENGAGE." The system can provide the prediction scores, impact scores, and candidate, role, and company data (e.g., the parameters of the machine learning process 200) for each identified target candidate to a natural language generation process 300. The natural language generation process 300 can generate optimal language for inclusion in communications to each target candidate. The system can process the generated optimal language and generate, for each target candidate, a recruitment communication (e.g., an email, text, etc.). In at least one embodiment, the system may generate the recruitment communication by populating, with the generated optimal language, one or more preconfigured communication templates. In various embodiments, the system can include a template generation interface that receives parameter inputs from a system profile, and, based on the inputs, generates a communication template (e.g., for use in generating communications for the profile).

Following recruitment communication generation, the system can transmit the recruitment communications to each target candidate. In one or more embodiments, the system can include one or more transmission parameters that can be configured via processing transmission parameter inputs from a system profile. For example, the system may receive, from a system profile, a transmission parameter input for scheduling communications to be automatically transmitted at a certain time and date. The system can process the transmission parameter input to generate and store a corresponding transmission parameter. In subsequent communication transmission processes (associated with the system profile), the system can retrieve and process the transmission parameter to, accordingly, schedule communication transmissions.

In at least one embodiment, the system can monitor transmitted communications (and responses thereto) to determine effectiveness of the transmitted communications. For example, the system can determine if a particular candidate engaged with a transmitted communication. If the system determines that engagement occurred, the system can retrieve communication content including, but not limited to, subject lines, communication content, and transmission parameters. The system can also update communications in which engagement did not occur to track success rates of each communication, thereby converting unknown but predicted outcomes into known outcomes for use as training data. The system can store the communication content, and can include one or more outcome metrics that indicate that the communication content elicited engagement, thereby advantageously informing future communication generation processes that the communication content may include optimal language and/or optimal transmission parameters.

FIG. 5 illustrates an exemplary automated alert process 500, according to one embodiment of the present disclosure. In at least one embodiment, user profiles of the present system can include "watch lists," or the like, that include candidates (or candidate profiles) selected by a user. In one or more embodiments, addition of a candidate to a watch list may represent that a user (associated with a user profile and the watch list) may wish to monitor the candidate for a change in predicted engagement. The user may be notified if a predicted engagement of a watched candidate changes.

At step 502, the system determines whether or not a user profile (e.g., a recruiter profile) includes a watch list. In at least one embodiment, if the system determines that the user profile does not include a watch list, the system suspends the automated alert process 500. In one or more embodiments, if the system determines that the user profile includes a watch list, the system proceeds to step 504.

At step 504, the system determines whether or not one or more candidates included in the watch list demonstrate a positive engagement change in one or more parameters (e.g., characteristics, etc.) previously determined, via calculated impact scores, to be predictive for voluntary turnover. In at least one embodiment, a positive engagement change refers to a change in a parameter that causes a prediction score and, thus a likelihood to engage, to increase. For example, the system may include, in a database thereof and for a particular candidate, a "relative pay" parameter determined to negatively influence a previously generated prediction score. The system relative pay parameter may be a ratio between the candidate's annual salary and the candidate's estimated cost of living. The system may determine that the candidate's relative pay parameter has decreased, thereby suggesting an increased prediction score and an increased likelihood that the candidate may engage with recruitment communications.

In various embodiments, if the system determines that one or more candidates included in the watch list do not demonstrate a positive change, the system suspends the automated alert process 500. In at least one embodiment, if the system determines that one or more candidates included in the watch list demonstrate a positive engagement change, the system proceeds to step 506.

At step 506, the system determines whether the user profile includes a preferences selection enabling automated alerts. In at least one embodiment, if the system determines that the user profile does not include the preferences selection enabling automated alerts, the system suspends the automated alert process 500. In one or more embodiments, if the system determines that the user profile does include the preferences selection enabling automated alerts, the system proceeds to step 508.

At step 508, the system automatically generates and transmits an alert to the user profile and/or to the user thereof. In one or more embodiments, the alert can be an electronic communication including, but not limited to: 1) a push notification; 2) an email; 3) a text message; and 4) one or more additional electronic notifications. The alert can include, but is not limited to: 1) the one or more candidates determined, at step 504, to demonstrate positive engagement changes; and 2) the one or more parameters that caused the positive engagement change (for each of the one or more candidates).

Figure 6A:
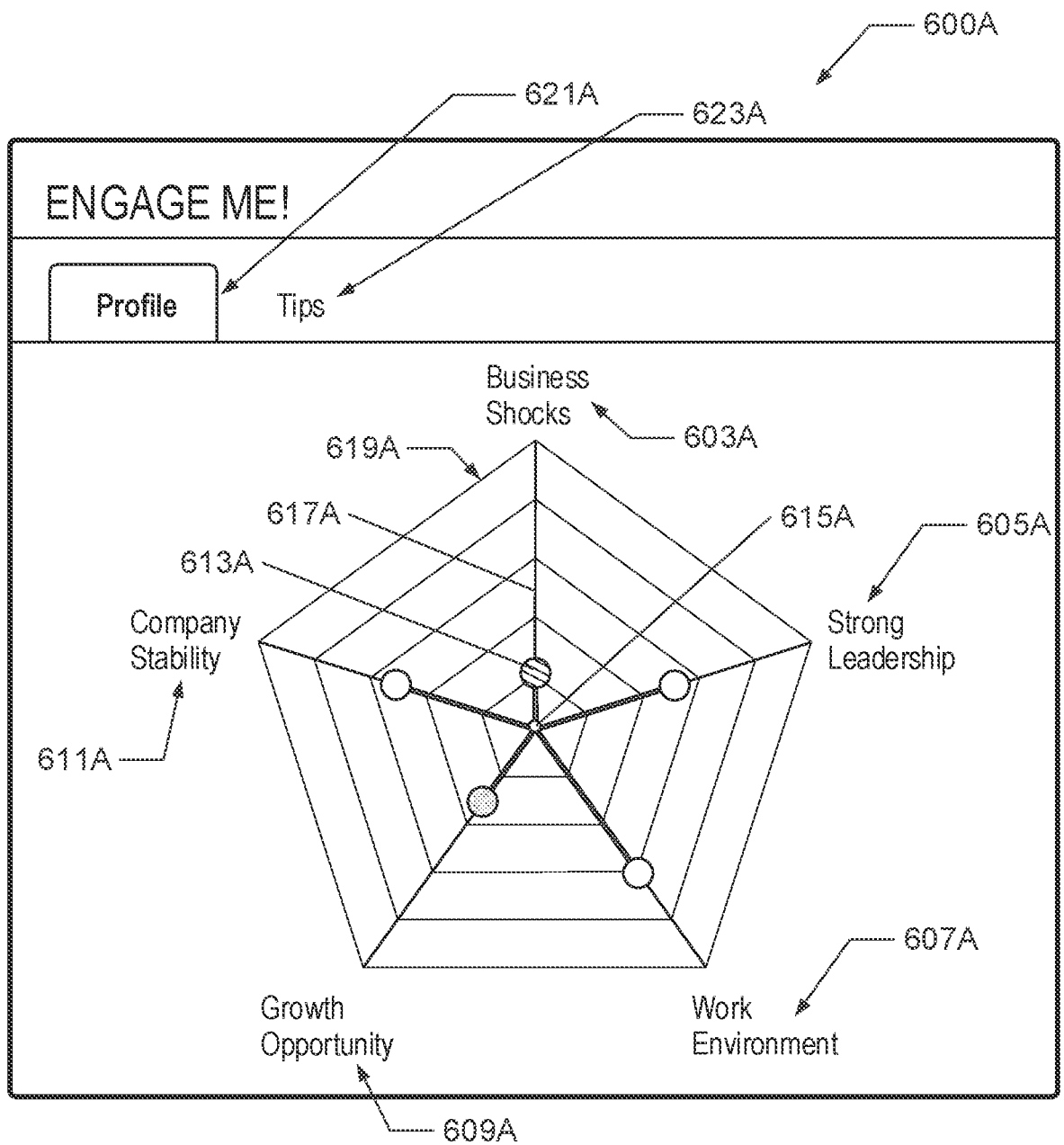
FIGS. 6A-B are exemplary candidate visualizations, according to one embodiment of the present disclosure.
Figure 6B:
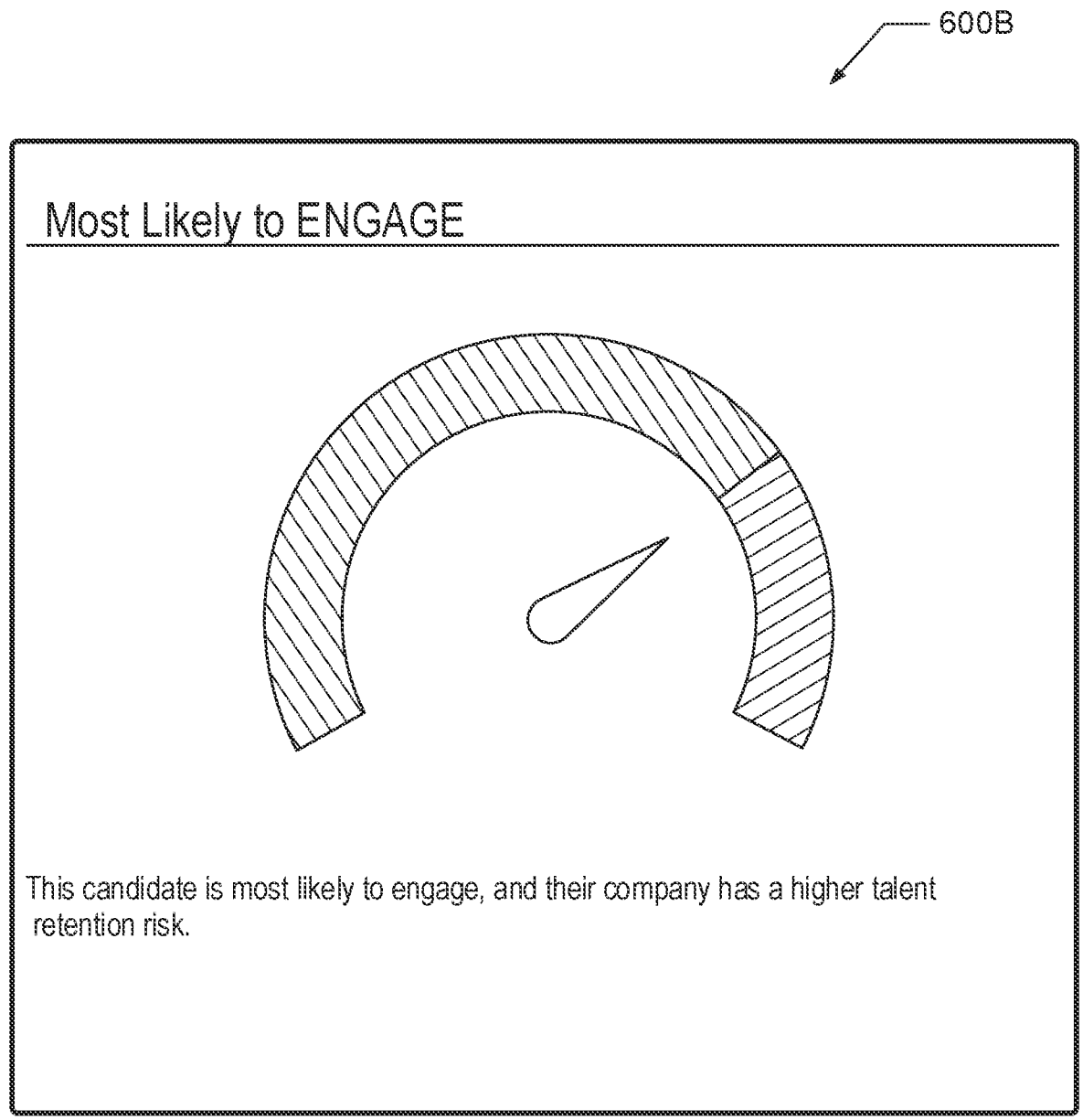
Figure 7:
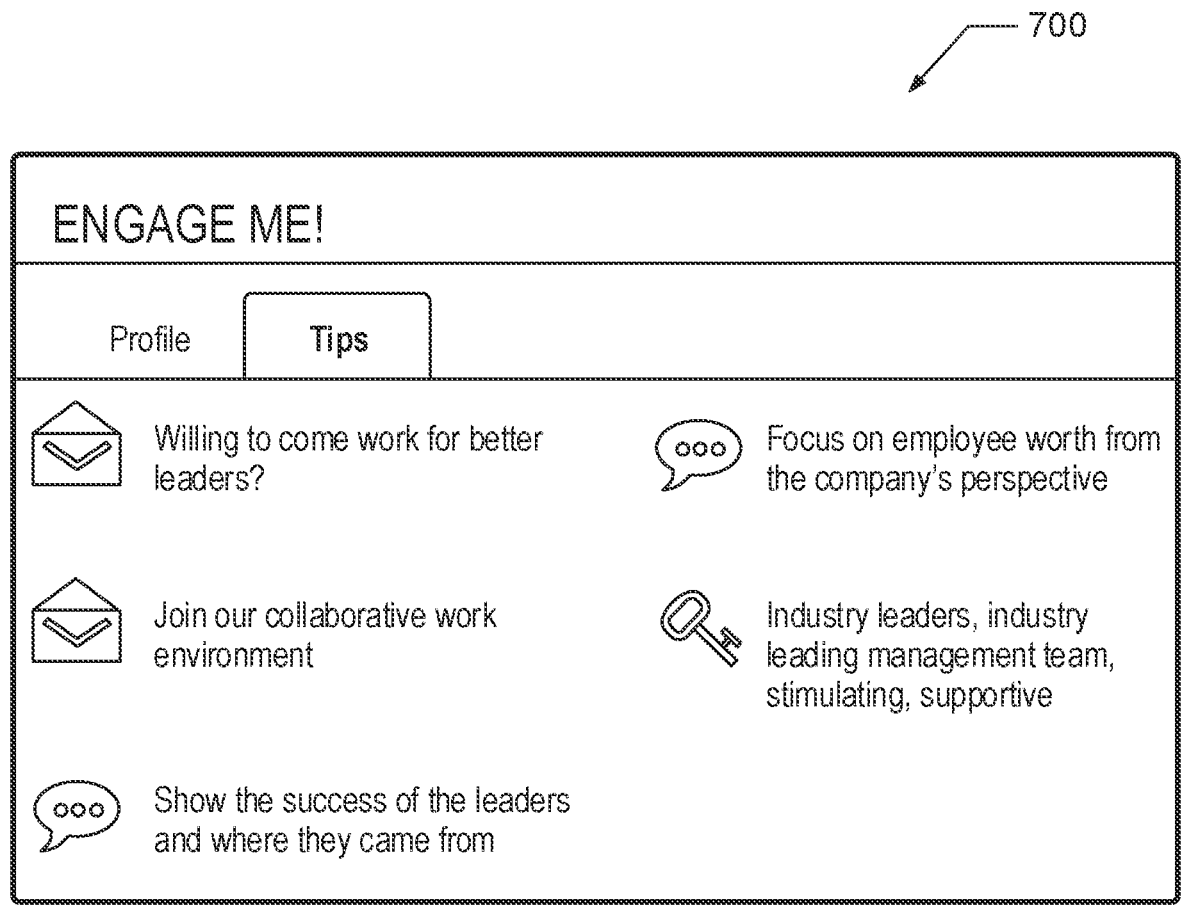
FIG. 7 is an exemplary engagement insight summary, according to one embodiment of the present disclosure.

FIG. 6A illustrates an exemplary radar chart 600A. As described herein, a radar chart 600A generally refers to a graphical model for displaying multivariate data in the form of a two-dimensional chart of a plurality of quantitative variables represented on axes starting from a central point. In various embodiments, the system may process data to generate a radar chart 600A. In at least one embodiment, the data can include, but is not limited to, prediction scores, classifications, impact scores, and category scores. The system may evaluate a plurality of impact scores to determine one or more most-impactful parameters. The system may classify each most-impactful parameter into an engagement category (as described herein). For example, the system may determine five most-impactful parameters including: 1) negative company events (e.g., such as missing an estimated revenue metric); 2) average tenure of current executive suite; 3) workplace rating; 4) average time between positions within current company; and 5) current company turnover rate. The system may classify each most-impactful parameter into an engagement category, such as, for example: 1) "Business Shocks" 603A; 2) "Strong Leadership" 605A; 3) "Work Environment" 607A; 4) "Growth Opportunity" 609A; and 5) "Company Stability" 611A.

The system may retrieve one or more control values for each most-impactful parameter. For each most-impactful parameter of a candidate, the system may compare a magnitude of the most-impactful parameter to a corresponding retrieved control value. For example, the system may: 1) compare negative company event metrics (e.g., frequency, severity, outcome, etc.) to averaged negative company event metrics (e.g., sourced from third party sources such as news reports, press releases, etc.); 2) compare an average tenure of current executive suite to an average tenure sourced from third party sources (e.g., professional networking websites); 3) compare a workplace rating to average workplace ratings of similar companies (e.g., such as ratings sourced from a third party review website); 4) compare average time between positions within the current company to averaged industry times (e.g., sourced from one or more third parties); and 5) compare the current company turnover rate to an averaged company turnover rate (e.g., sourced from industry data).

In various embodiments, based on control comparisons, the system may generate (or retrieve), for each most-impactful parameter, a visualization scale. In various embodiments, a visualization scale refers to a scale for scoring a magnitude of a most-impactful parameter against one or more control values. In at least one embodiment, a visualization scale may be a standard deviation scale. For example, a midpoint of a visualization scale may represent a control value, and values above and below the midpoint may be of a particular standard deviation from the midpoint. In one or more embodiments, the system, to generate a visualization scale, may retrieve, normalize, and average data associated with a plurality of candidates and/or organizations (e.g., to calculate control values and standard deviations therefrom).

In various embodiments, the system may generate a radar chart 600A including the assigned engagement categories 605-611A, and, for each most-impactful parameter, may leverage a visualization scale to generate and position a data point 613A (e.g., the system may generate and position a plurality of data points 613A). In at least one embodiment, the system may position a data point 613A at a particular distance from a center point 615A (of the radar chart 600A). The center point 615A may represent a maximum deviation of a parameter beneath a control value. Accordingly, a midpoint 617A between the center point 615A and a perimeter 619A (of the radar chart 600A) may represent the control value. A distance with which each data point 613A is positioned from the center point 615A may be based on a standard deviation between the corresponding control value and most-impactful parameter. In one or more embodiments, the system may position each data point 613A in alignment with a corresponding engagement category 603-611A.

In an exemplary scenario, the system can receive and normalize data associated with a particular candidate. The system can apply one or more machine learning techniques (as described herein) to analyze parameters of the candidate, determine parameter impacts, and classify the candidate. The system can identify one or more most-impactful parameters, and can classify each of the one or more most-impactful parameters into an engagement category 603-611A. The system can compare each most-impactful parameter to a retrieved or determined control value, and, based on the comparisons, can generate a visualization scale and data point 613A. The system can leverage the engagement categories, most-impactful parameters, comparisons, and visualization scales to generate a radar chart 600A. The radar chart 600A can include a data point 613A positioned near a midpoint 615A. The radar chart 600A and data point 613A may indicate that an associated company (e.g., of an associated candidate, for which the radar chart 600A was generated) demonstrates a level of "Business Shocks" 603A that is below an industry average (e.g., the company has experienced a less than average amount of negative events). The radar chart 600A may indicate that the associated company further demonstrates: 1) "Strong Leadership" that is on parity with averaged leadership strength (e.g., C-suite tenure is comparable to industry averages); 2) "Work Environment" that is above average (e.g., the company's workplace ratings are higher than ratings of similar companies); 3) "Growth Opportunity" that is below industry average (e.g., the company demonstrates above average times between positions); and 4) "Company Stability" that is on parity with averaged company stability (e.g., the company demonstrates a turnover rate similar to an industry average turnover rate). By visualizing metrics and factors that may lead a candidate to leave or stay at a company, the radar chart 600A can provide a visualization of most-impactful parameters that may be leveraged to readily and rapidly formulate evaluations and communication strategies for potential candidates.

In at least one embodiment, the radar chart 600A may include a profile tab 621A and a tips tab 623A. The profile tab 621A may display the radar chart 600A. The tips tab 623A may be a link to a set of tips for engaging with a candidate (or organization) associated with the radar chart 600A. In various embodiments, the system may generate one or more tips based on the radar chart 600A. For example, a radar chart 600A may include a data point 613A aligned with an engagement category "Strong Leadership." The data point 613A may be positioned very close to a midpoint 615A, thereby indicating that an organization associated with a particular candidate demonstrates a below average leadership strength (e.g., the organization's C-suite demonstrates below average tenure). The system may modify a tips tab 623A to include one or more tips directing strategies for engaging the candidate. For example, the tips tab 623A may include a tip to, while communicating with the candidate, highlight the demonstrated volatility of leadership within the candidate's current company, and to direct the candidate to organizations with higher leadership strength. In at least one embodiment, the system may generate and/or retrieve a set of companies within the same industry as (or otherwise similar to) the current organization, the set of companies demonstrating superior qualities (e.g., as demonstrated by parameter comparisons to control values). The system may include the set of companies on the tips tab 623A, thereby providing a source of organizations that a candidate may wish to join, based on demonstrated superior metrics thereof.

CONCLUSION

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

We claim:

1. A machine learning process for optimized engagement, comprising:

training, with a training set, at least one primary machine learning computer model to generate a plurality of machine predicted outcomes;

determining one or more weights based on the plurality of machine predicted outcomes and the training set;

generating at least one secondary machine learning computer model based on the one or more weights;

generating, via the at least one secondary machine learning computer model, one or more machine learned predictions;

assigning a respective classification to each individual of a plurality of individuals based on the one or more machine learned predictions;

receiving a set of candidate criteria;

processing the set of candidate criteria to identify a subset of individuals from the plurality of individuals that satisfies the set of candidate criteria;

determining a ranking of the subset of individuals based on the respective classification assigned to individual ones of the subset of individuals; and generating a notification based on the ranking, wherein the at least one secondary machine learning computer model is generated by combining one or more intermediary machine learning models according to:

$$E(x_{ijg}) = E(f_1(x_{ijg}), \ldots, f_n(x_{ijg}));$$

wherein:

$E(x_{ijg})$ represents the second machine learning model;

f is an intermediary machine learning model;

x is a vector comprising the normalized data of interest;

i is a candidate;

j is a company currently employing the candidate i; and g is a role performed by the candidate i at the company j.

2. The machine learning process of claim 1, further comprising:

receiving, from one or more databases, data associated with the plurality of individuals, wherein a portion of the received data is received in response to predetermined data triggers configured to monitor changes to a current status of the received data;

determining, for each individual of the plurality of individuals, data of interest within the received data, the data of interest comprising candidate information, role information, and company information;

normalizing the data of interest into a normalized format to generate normalized data; and creating, from the normalized data of interest, the training set comprising known parameters and known outcomes.

3. The machine learning process of claim 2, wherein generating the at least one secondary machine learning computer model comprises:
creating, from the normalized data of interest, a test set with unknown parameters; and
weighting the unknown parameters with the one or more weights.

4. The machine learning process of claim 3, further comprising:
calculating the one or more weights from the plurality of machine predicted outcomes and the training set; and
weighting the known parameters with the one or more weights via the at least one primary machine learning computer model.

5. The machine learning process of claim 2, wherein normalizing the data of interest further comprises performing entity resolution on the data of interest.

6. The machine learning process of claim 1, further comprising:
calculating, for each parameter of each identified individual, an impact score;
determining, for each parameter and based on each impact score, at least one most impactful parameter;
generating a candidate list based on the ranking of the subset of individuals; and
providing, in the candidate list, the at least one most impactful parameter for the individual ones of the subset of individuals.

7. The machine learning process of claim 6, wherein determining the at least one most impactful parameter comprises one or more feature importance methods.

8. The machine learning process of claim 7, wherein determining the at least one most impactful parameter further comprises:
determining at least one most positively impactful parameter; and
determining at least one most negatively impactful parameter.

9. A machine learning process for optimized engagement, comprising:
training, with a training set, at least one primary one machine learning computer model to generate a plurality of machine predicted outcomes;
determining one or more weights based on the plurality of machine predicted outcomes and the training set;
generating at least one secondary machine learning computer model based on the one or more weights;
generating, via the at least one secondary machine learning computer model, one or more machine learned predictions;
aggregating the one or more machine learned predictions;
generating, from the aggregated machine learned predictions, a talent retention score; and
sending a notification based on the talent retention score, wherein the at least one secondary machine learning computer model is generated by combining one or more intermediary machine learning models according to:

$$E(x_{ijg}) = E(f_1(x_{ijg}), \ldots, f_n(x_{ijg}));$$

wherein:
$E(x_{ijg})$ represents the second machine learning model;
f is an intermediary machine learning model;
x is a vector comprising the normalized data of interest;
i is a candidate;
j is a company currently employing the candidate i; and
g is a role performed by the candidate i at the company j.

10. The machine learning process of claim 9, further comprising:
receiving, from one or more databases, data associated with a plurality of employed individuals, wherein a portion of the received data is received in response to predetermined data triggers configured to monitor changes to a current status of the received data;
determining, for each individual, data of interest within the received data, the data of interest comprising candidate information, role information, and company information;
normalizing the data of interest into a normalized format; and
creating, from the normalized data, the training set comprising known parameters and known outcomes.

11. The machine learning process of claim 10, wherein the plurality of individuals are employed in a particular department.

12. The machine learning process of claim 10, wherein the plurality of individuals are employed in a particular location.

13. The machine learning process of claim 10, wherein the plurality of individuals present a particular experience level.

14. The machine learning process of claim 10, wherein generating the at least one secondary machine learning computer model comprises:
creating, from the normalized data of interest, a test set with unknown parameters; and
weighting the unknown parameters with the one or more weights.

15. The machine learning process of claim 9, further comprising:
comparing the talent retention score to one or more predefined thresholds; and
based on the comparison, assigning a classification to the talent retention score, wherein the classification is selected from a group comprising of low, average, and high.

16. A machine learning system for optimized engagement, comprising:
at least one database; and
at least one processor in communication with the at least one database, the at least one processor being configured to:
train, with a training set, at least one primary one machine learning computer model to generate a plurality of machine predicted outcomes;
determine one or more weights based on the plurality of machine predicted outcomes and the training set;
generate at least one secondary machine learning computer model based on the one or more weights;
generate, via the at least one secondary machine learning computer model, one or more machine learned predictions; and
assign a respective classification to each individual of a plurality of individuals based on the one or more machine learned predictions,
wherein the at least one processor, to generate the at least one secondary machine learning model, is further configured to generate the at least one secondary model by combining one or more intermediary machine learning models according to:

$$E(x_{ijg}) = E(f_1(x_{ijg}), \ldots, f_n(x_{ijg}));$$

wherein:
$E(x_{ijg})$ represents the second machine learning model;
f is an intermediary machine learning model;
x is a vector comprising the normalized data of interest;

i is a candidate;
j is a company currently employing the candidate i; and
g is a role performed by the candidate i at the company j.

17. The machine learning system of claim 16, wherein the at least one processor is further configured to:
   receive one or more predetermined triggers configured to monitor changes to a current status of data associated with the plurality of individuals, wherein the one or more predetermined triggers cause the at least one processor to retrieve, from the at least one database, the data associated with the plurality of individuals;
   determine a respective data of interest within the retrieved data for each of the plurality of individuals, the respective data of interest comprising candidate information, role information, and company information;
   normalize the respective data of interest for each of the plurality of individuals into a normalized format; and
   create the training set from the normalized data, the training set comprising known parameters and known outcomes.

18. The machine learning system of claim 17, wherein:
   the candidate information comprises current tenure, average tenure in previous roles, number of previous roles with current company, number of previous roles at other companies, skills, education level, relative pay, previous industries, previous company size, previous company age, geography, and commute time;
   the role information comprises title, level, functions, similar open positions, and open growth opportunities; and
   the company information comprises company type, company size, age, brand measurements, news and events, and trends in news and events.

19. The machine learning system of claim 18, wherein the company type is selected from a group comprising: public, private, government, and school.

20. The machine learning system of claim 17, wherein training comprises:
   calculating, from the plurality of machine predicted outcomes and the training set, one or more weights; and
   weighting, with the one or more weights and via the at least one primary machine learning computer model, the known parameters.

21. The machine learning system of claim 16, wherein generating the at least one secondary machine learning computer model comprises:
   creating, from normalized data of interest, a test set with unknown parameters; and
   weighting the unknown parameters with the one or more weights.

22. The machine learning system of claim 16, wherein the at least one processor is further configured to:
   compare the one or more machine learned predictions and the classifications to third-party data from the at least one database;
   determine particular language comprising subject lines and keywords from the third-party data that is likely to elicit a response from each of the plurality of individuals, based on the one or more machine learned predictions and the classifications; and
   generate one or more strings of text via natural language processing, wherein the one or more strings of text comprise language substantially similar to the particular language.

23. The machine learning system of claim 22, wherein the at least one processor, to generate the one or more strings of text, is further configured to select at least a portion of the one or more strings of text using at least one conditional logic process.

24. A machine learning system for optimized engagement, comprising:
   at least one database; and
   at least one processor in communication with the at least one database, the at least one processor being configured to:
   train, with a training set, at least one primary one machine learning computer model to generate a plurality of machine predicted outcomes;
   determine one or more weights based on the plurality of machine predicted outcomes and the training set;
   generate at least one secondary machine learning computer model based on the one or more weights;
   generate, via the at least one secondary machine learning computer model, one or more machine learned predictions; and
   assign a respective classification to each individual of a plurality of individuals based on the one or more machine learned predictions,
   wherein the at least one processor, to assign the classification, is configured to evaluate and assign each of the one or more machine learned predictions according to:

$$c(x_{ijg}) = \begin{cases} \text{candidate is least likely to ENGAGE if } h(x_{ijg}) < h_0 \\ \text{candidate may ENGAGE if } h_0 < h(x_{ijg}) < h_1 \\ \text{candidate is more likely to ENGAGE } h_1 < h(x_{ijg}) < h_2 \\ \text{candidate is most likely to ENGAGE } h(x_{ijg}) > h_2 \end{cases};$$

wherein:
   $h(x_{ijg})$ is a machine learned prediction from the one or more machine learned predictions;
   $h_0$ is a predefined will-not-engage threshold;
   $h_1$ is a predefined may-engage threshold;
   $h_2$ is a predefined more-likely-to-engage threshold; and
   $c(x_{ijg})$ is the classification to which each one the one or more machine learned predictions is assigned.

25. The machine learning system of claim 16, wherein the at least one processor is further configured to:
   retrieve, from the at least one database, a plurality of historical classifications associated with the plurality of individuals;
   determine, for each individual, if a historical classification matches the assigned classification;
   upon determining, for a particular individual, that the assigned classification does not match the historical classification, determine if the particular individual is included on a recruitment watch list; and
   upon determining, that the particular individual is included on the recruitment watch list, automatically generate and transmit, to a profile associated with the recruitment watch list, an alert describing that a classification for the particular individual has changed.

26. The machine learning system of claim 25, wherein the assigned classification of the particular individual is determined to exceed the historical classification.

27. The machine learning system of claim 16, wherein the at least one processor is further configured to generate, for each individual, a data visualization comprising the classification and the one or more machine learned predictions.

28. The machine learning system of claim 27, wherein the data visualization is a radar chart.

29. A machine learning process for optimized engagement, comprising:
- training, with a training set, at least one primary machine learning computer model to generate a plurality of machine predicted outcomes;
- determining one or more weights based on the plurality of machine predicted outcomes and the training set;
- generating at least one secondary machine learning computer model based on the one or more weights;
- generating, via the at least one secondary machine learning computer model, one or more machine learned predictions;
- assigning a respective classification to each individual of a plurality of individuals based on the one or more machine learned predictions;
- receiving a set of candidate criteria;
- processing the set of candidate criteria to identify a subset of individuals from the plurality of individuals that satisfies the set of candidate criteria;
- determining a ranking of the subset of individuals based on the respective classification assigned to individual ones of the subset of individuals; and
- generating a notification based on the ranking,
- wherein the assigning the classification to each individual of the plurality of individuals further comprises evaluating and assigning each of the one or more machine learned predictions according to:

$$c(x_{ijg}) = \begin{cases} \text{candidate is least likely to ENGAGE if } h(x_{ijg}) < h_0 \\ \text{candidate may ENGAGE if } h_0 < h(x_{ijg}) < h_1 \\ \text{candidate is more likely to ENGAGE } h1 < h(x_{ijg}) < h_2 \\ \text{candidate is most likely to ENGAGE } h(x_{ijg}) > h_2 \end{cases}$$

wherein:
- $h(x_{ijg})$ is a machine learned prediction from the one or more machine learned predictions;
- $h_0$ is a predefined will-not-engage threshold;
- $h_1$ is a predefined may-engage threshold;
- $h_2$ is a predefined more-likely-to-engage threshold; and
- $c(x_{ijg})$ is the classification to which each one the one or more machine learned predictions is assigned.

30. A machine learning process for optimized engagement, comprising:
- training, with a training set, at least one primary one machine learning computer model to generate a plurality of machine predicted outcomes;
- determining one or more weights based on the plurality of machine predicted outcomes and the training set;
- generating at least one secondary machine learning computer model based on the one or more weights;
- generating, via the at least one secondary machine learning computer model, one or more machine learned predictions;
- assigning a respective classification to each individual of a plurality of individuals based on the one or more machine learned predictions;
- aggregating the one or more machine learned predictions;
- generating, from the aggregated machine learned predictions, a talent retention score; and
- sending a notification based on the talent retention score,
- wherein the assigning the classification to each individual of the plurality of individuals further comprises evaluating and assigning each of the one or more machine learned predictions according to:

$$c(x_{ijg}) = \begin{cases} \text{candidate is least likely to ENGAGE if } h(x_{ijg}) < h_0 \\ \text{candidate may ENGAGE if } h_0 < h(x_{ijg}) < h_1 \\ \text{candidate is more likely to ENGAGE } h1 < h(x_{ijg}) < h_2 \\ \text{candidate is most likely to ENGAGE } h(x_{ijg}) > h_2 \end{cases}$$

wherein:
- $h(x_{ijg})$ is a machine learned prediction from the one or more machine learned predictions;
- $h_0$ is a predefined will-not-engage threshold;
- $h_1$ is a predefined may-engage threshold;
- $h_2$ is a predefined more-likely-to-engage threshold; and
- $c(x_{ijg})$ is the classification to which each one the one or more machine learned predictions is assigned.

* * * * *